US010279907B2

(12) United States Patent
Shepshelovich et al.

(10) Patent No.: US 10,279,907 B2
(45) Date of Patent: May 7, 2019

(54) METHOD FOR OPERATING AN AIR VEHICLE

(71) Applicant: Israel Aerospace Industries Ltd., Lod (IL)

(72) Inventors: Michael Shepshelovich, Ganei Tikva (IL); Danny Abramov, Rehovot (IL); Yonatan Klein, Nes-Ziona (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 15/113,368

(22) PCT Filed: Jan. 27, 2015

(86) PCT No.: PCT/IL2015/050097
§ 371 (c)(1),
(2) Date: Jul. 21, 2016

(87) PCT Pub. No.: WO2015/114625
PCT Pub. Date: Aug. 6, 2015

(65) Prior Publication Data
US 2016/0347451 A1     Dec. 1, 2016

(51) Int. Cl.
*B64C 39/02*    (2006.01)
*B64C 3/14*    (2006.01)
*B64C 13/16*    (2006.01)
*B64C 29/00*    (2006.01)
(Continued)

(52) U.S. Cl.
CPC ............ *B64C 39/024* (2013.01); *B64C 3/14* (2013.01); *B64C 13/16* (2013.01); *B64C 15/12* (2013.01); *B64C 29/00* (2013.01); *B64D 43/02* (2013.01); *B64C 2201/084* (2013.01); *B64C 2201/104* (2013.01); *Y02T 50/12* (2013.01)

(58) Field of Classification Search
CPC ......... B64C 39/024; B64C 3/14; B64C 13/16; B64C 15/12; B64C 29/00; B64D 43/02
See application file for complete search history.

(56) References Cited

U.S. PATENT DOCUMENTS 7,992,827 B2    8/2011    Shepshelovich et al.
8,109,473 B2    2/2012    Shepshelovich et al.
(Continued)

OTHER PUBLICATIONS

Elsenaar, A., "Reynolds Number Effects in Transonic Flow," AGARDograph No. 303, AGARD, Specialised Printing Services Limited, Loughton, Essex, GB, Dec. 1988.
(Continued)

*Primary Examiner* — Anne M Antonucci
*Assistant Examiner* — Renee LaRose
(74) *Attorney, Agent, or Firm* — Dorsey & Whitney LLP

(57) ABSTRACT

Methods are provided for operating an air vehicle having fixed wings. Such methods include the step of providing an operating map of angle of attack associated with the fixed wings with Reynolds number, including conditions of separated flow over the fixed wings and conditions of attached flow over the fixed wings. Such methods also include the step of using the operating map for guidance, causing the air vehicle to operate at least within a low Reynolds numbers range corresponding to the operating map, such as to avoid or minimize risk of causing the air vehicle to operate at conditions of separated flow over the fixed wings.

27 Claims, 23 Drawing Sheets

(51) Int. Cl.
*B64D 43/02* (2006.01)
*B64C 15/12* (2006.01)

(56) References Cited

U.S. PATENT DOCUMENTS

2007/0278353 A1    12/2007  Shepshelovich et al.
2008/0283674 A1*   11/2008  Shepshelovich .......... B64C 3/14
                                                    244/35 R

OTHER PUBLICATIONS

Miley, S.J., "A Catalogue of Low Reynolds Number Airfoil Data for Wind Turbine Applications," RFP-3387, US-60, Dept. of Aerospace Engineering, Texas A&M University, College Station, TX, Feb. 19, 1982.

* cited by examiner

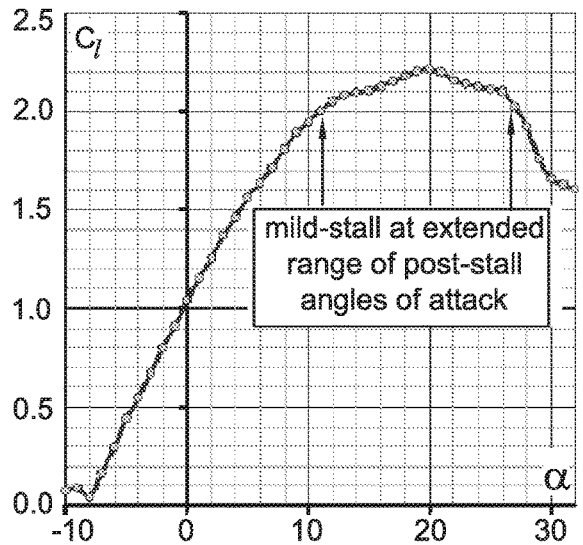
Fig. 5
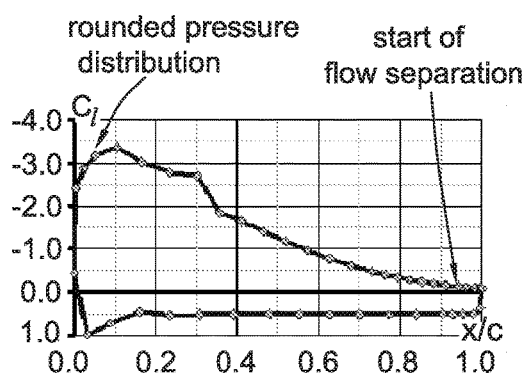
Fig. 6(a) α=12°, $C_l$=2.05
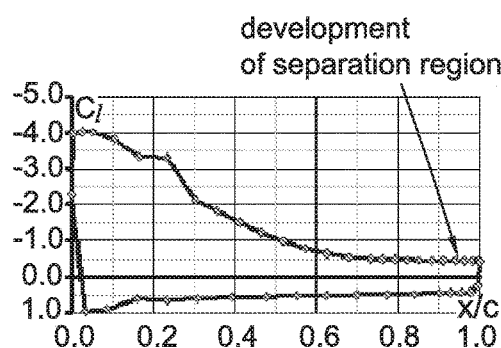
Fig. 6(b) α=20°, $C_l$=2.21
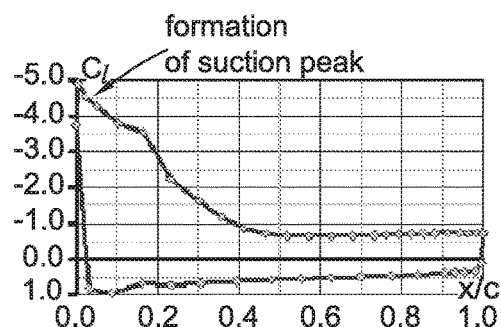
Fig. 6(c) α=25°, $C_l$=2.10
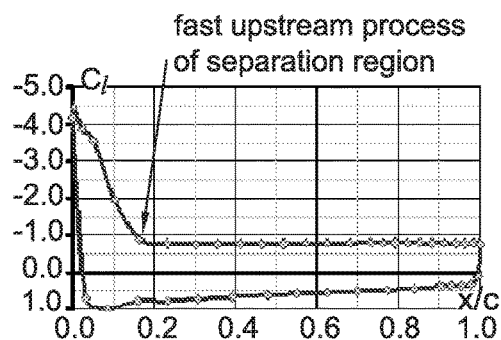
Fig. 6(d) α=32°, $C_l$=1.60

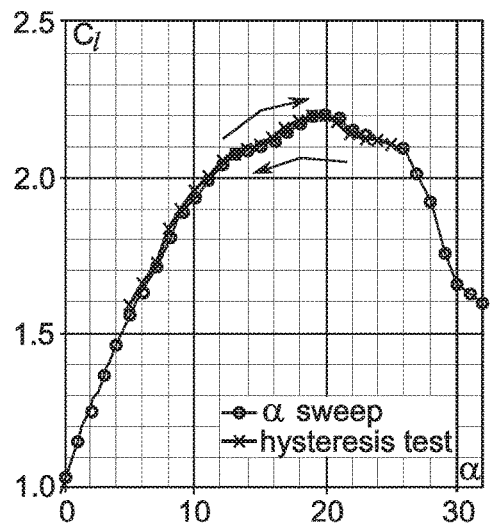
Fig. 7(a) up to α=29°
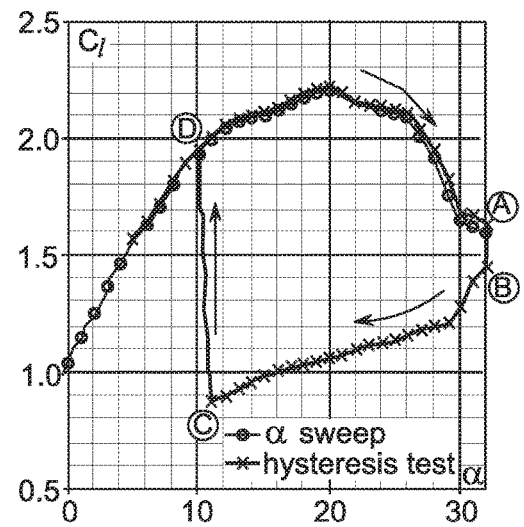
Fig. 7(b) up to α=32°
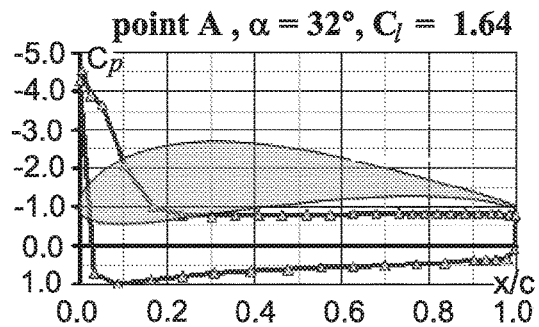
Fig. 8(a)
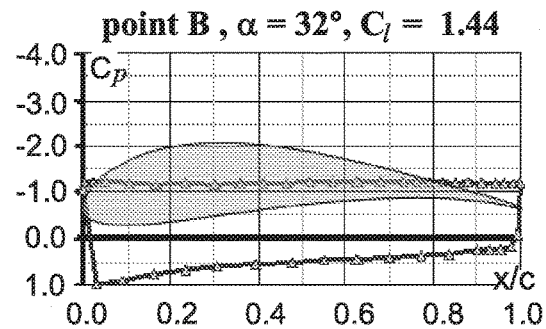
Fig. 8(b)
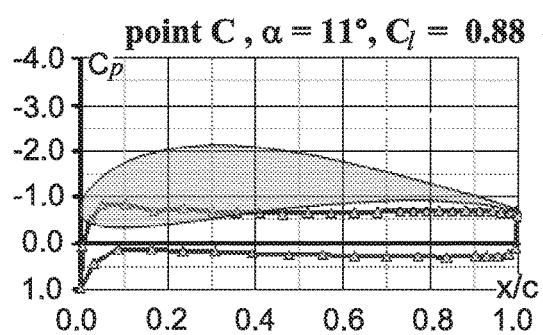
Fig. 8(c)
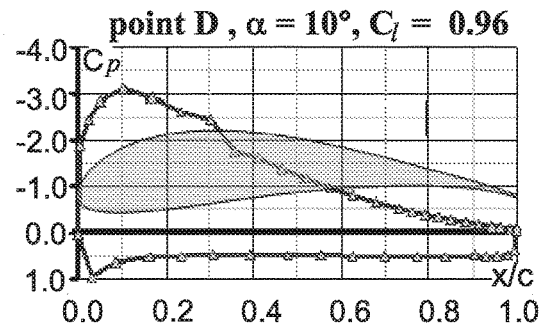
Fig. 8(d)

| strip number | location | width | grit |
|---|---|---|---|
| ① | 10-15%c - upper | 12mm | 120 |
| ② | 2-7%c - upper | 12mm | 80 |
| ③ | 2-3%c - lower | 5mm | 60 |

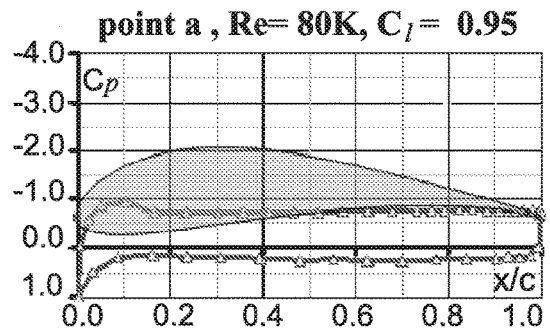
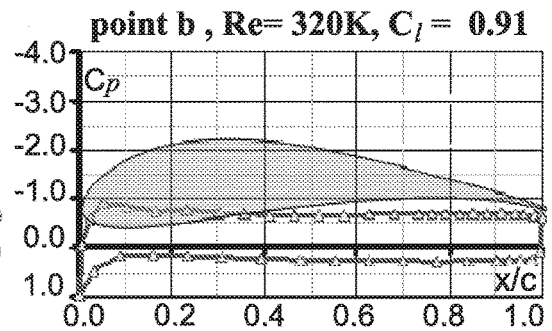
Fig. 16(a)    Fig. 16(b)
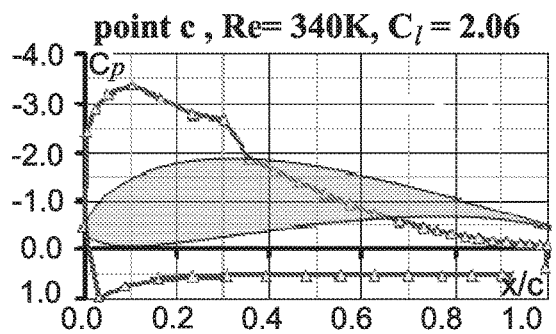
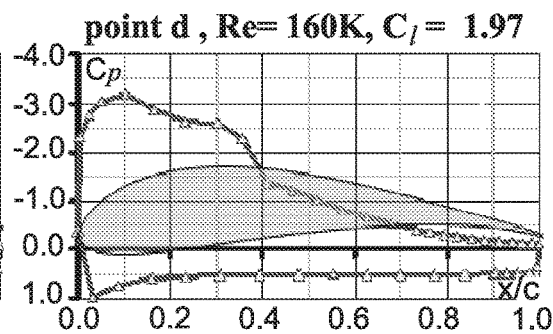
Fig. 16(c)    Fig. 16(d)
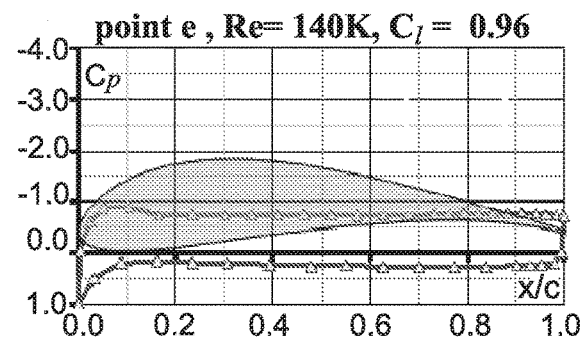
Fig. 16(e)

$(t/c)_{max}=17.4\%$
$(z_c/c)_{max}=7.2\%$

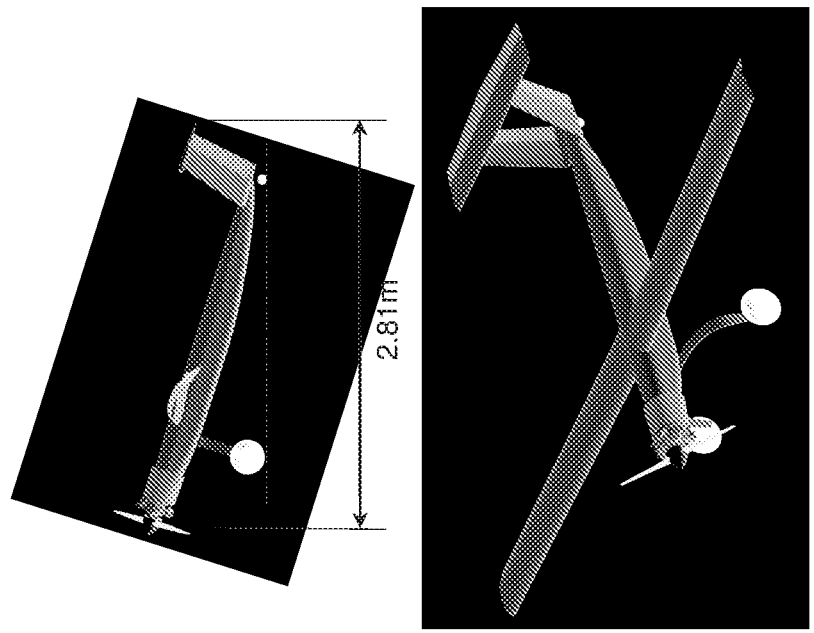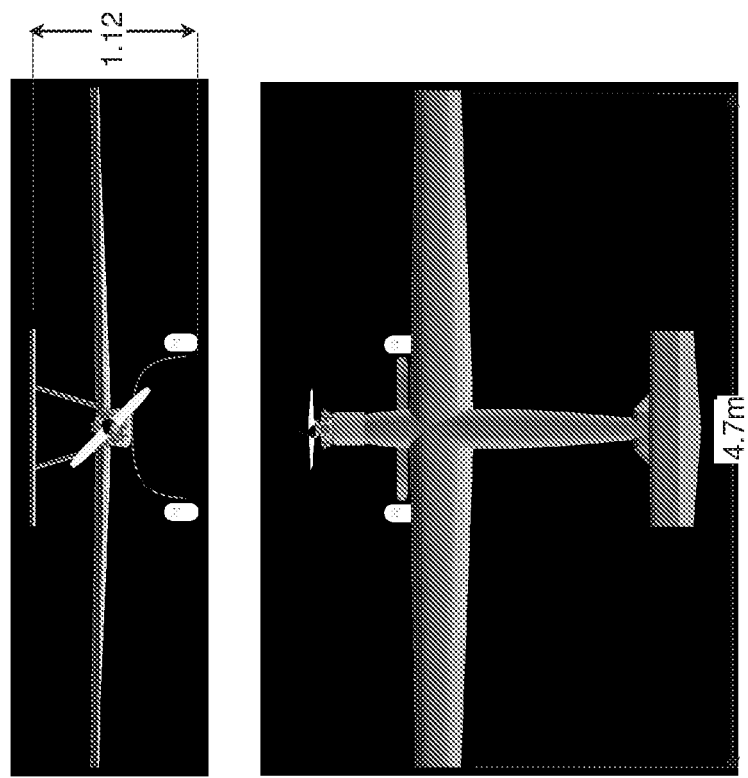
Fig. 29

METHOD FOR OPERATING AN AIR VEHICLE

TECHNOLOGICAL FIELD

The presently disclosed subject matter relates to methods of operating air vehicles and to air vehicles thus operated.

PRIOR ART

References considered to be relevant as background to the presently disclosed subject matter are listed below:
U.S. Pat. No. 7,992,827
U.S. Pat. No. 8,109,473
Acknowledgement of the above references herein is not to be inferred as meaning that these are in any way relevant to the patentability of the presently disclosed subject matter.

BACKGROUND

Conventional aircraft accelerating during ground run at take-off from zero airspeed to lift-off airspeed, encounter very low Reynolds numbers at the start of acceleration Similarly, VTOL VSTOL and STOVL aircraft transitioning from hovering vectored flight to aerodynamic flight also essentially accelerate from zero forward airspeed to cruising airspeed, for example, and similarly encounter very low Reynolds numbers at the start of acceleration.

At such very low Reynolds numbers, unfavorable flow phenomena can be encountered, referred to herein as the unfavorable flow phenomena domain. Such phenomena include separated flow over the wings at low Reynolds numbers, including laminar leading edge stall and the burst of laminar separation bubble, which can sometimes distort the aerodynamics characteristics of the air vehicle, leading to problems of flight safety and radical degradation of air vehicle performance including poor lift and high drag. The range of Reynolds numbers associated with the unfavorable phenomena domain is typically about $0.1*10^6$ to about $0.5*10^6$.

For large conventional aircraft, having wings with aerofoil sections of relatively large chords and operating at relatively high cruising airspeeds (with correspondingly high Reynolds numbers), the stage of experiencing such low Reynolds numbers during aircraft acceleration is very short, and occurs while the aircraft is still not airborne. Such large conventional aircraft thus achieve very quickly relatively high Reynolds numbers that are beyond the low Reynolds numbers range corresponding to the unfavorable flow phenomena domain, and thus in a practical sense such phenomena do not affect the operation of such aircraft.

On the other hand, the situation is rather different for small aircraft, such as for example Tactical UAV (for example having a weight of between 10 kg and 300 kg). In such small aircraft, the relatively low final airspeed after the stage of acceleration, combined with small wing chords, can correspond to relative small Reynolds numbers within the low Reynolds number range corresponding to the unfavorable flow phenomena domain, which conventionally leads to the aforesaid problems.

GENERAL DESCRIPTION

According to at least some aspects of the presently disclosed subject matter, there is provided a method for operating an air vehicle having fixed wings, comprising:

(A) providing an operating map of angle of attack associated with the fixed wings with Reynolds number, including conditions of separated flow over the fixed wings and conditions of attached flow over the fixed wings;

(B) using the operating map for guidance, causing the air vehicle to operate at least within a low Reynolds numbers range corresponding to the operating map, such as to avoid or minimize risk of causing the air vehicle to operate at conditions of separated flow over the fixed wings.

For example, the operating map comprises:

a first operating region in said operating map comprising a plurality of first points therein, each said first point representing a respective first set of a respective said angle of attack and a respective said Reynolds number, said first operating region defining a first operating boundary comprising a first variation of a maximum Reynolds number limit with said angle of attack;

a second operating region in said operating map comprising a plurality of second points therein, each said second point representing a respective second set of a respective said angle of attack and a respective said Reynolds number, said second operating region defining a second operating boundary comprising a second variation of a minimum Reynolds number limit with said angle of attack;

a third operating region in said operating map extending between said first operating boundary and said second operating boundary, said third operating region comprising a plurality of third points therein, each said third point representing a respective third set of a respective said angle of attack and a respective said Reynolds number, each said first point in said first region corresponding to conditions of separated flow over the fixed wings irrespective of whether or not the respective said first point was reached from any one of said third points;

each said second point in said second region corresponding to conditions of attached flow over the fixed wings irrespective of whether or not the respective said second point was reached from any one of said third points; and each said third point in said third region corresponding to conditions of attached flow or to conditions of separated flow over the fixed wings, depending on whether the respective said third point was reached from any one of said second points or from any one of said first points, respectively;

For example, step (B) comprises:

(b) causing the air vehicle to operate at a desired said third point by reaching the desired said third point from a first desired said second point.

For example, prior to step (b) the air vehicle has nominally zero forward speed, the method comprising the step:

(c) causing the air vehicle to arrive at said desired second point from a nominal said first point corresponding to said nominally zero forward speed.

For example, the method is particularly for operating the air vehicle to attain aerodynamic flight from conditions of nominally zero forward velocity, comprising the step:

(c) causing the air vehicle to arrive at said desired second point from a nominal said first point corresponding to said nominally zero forward speed.

Additionally or alternatively, at said nominal first point, the air vehicle is on the ground, or, at said nominal first point, the air vehicle is supported by an external structure.

Additionally or alternatively, step (c) comprises accelerating the air vehicle to attain a forward speed via a forward thrust generated by the air vehicle.

Additionally or alternatively, step (c) comprises accelerating the air vehicle to attain a forward speed via an external acceleration structure.

Additionally or alternatively, said external acceleration structure comprises a catapult system.

Alternatively, at said nominal first point, the air vehicle is in vectored flight, wherein a vertical vectored thrust generated by the air vehicle support the weight of the air vehicle. For example, step (c) comprises accelerating the air vehicle to attain a forward speed via a forward vectored thrust generated by the air vehicle.

Additionally or alternatively, step (c) comprises applying a forward speed to the air vehicle while causing the air vehicle to adopt a respective said angle of attack for the wings having a non-positive value at least at said desired first point. For example, this can comprise maintaining the respective said angle of attack for the wings at said non-positive value as said forward speed is increased to a first speed at which the lift generated by the wings is a first proportion of the weight of the air vehicle, and thereafter increasing the respective said angle of attack at said first speed until the air vehicle reaches said desired third point. For example, said first proportion is between 0.2 and 0.4 of the weight of the air vehicle, and further comprising subsequently concurrently increasing the speed and angle of attack to reach a second desired third point. For example, said first proportion is between 0.4 and 0.6 of the weight of the air vehicle, and further comprising subsequently increasing the angle of attack while concurrently maintaining constant speed to reach a second desired third point.

Additionally or alternatively, step (c) comprises applying a forward speed to the air vehicle while causing the air vehicle to adopt a respective said angle of attack for the wings having a small positive value at least at said desired first point, and causing the air vehicle to reach said first desired second point by increasing air speed of the air vehicle. For example, this can comprise maintaining the respective said angle of attack for the wings at said small positive value as said forward speed is increased to a first speed at which the lift generated by the wings is a first proportion of the weight of the air vehicle, and thereafter increasing the respective said angle of attack and said speed until the air vehicle reaches said desired third point. For example, said first proportion is between 0.2 and 0.4 of the weight of the air vehicle, and wherein said small positive value is between 1° and 5°.

Additionally or alternatively, at said desired third point the respective said Reynolds numbers corresponds to a forward speed of the air vehicle not less than the stall speed of the air vehicle.

Additionally or alternatively, at said desired third point the respective said Reynolds numbers is less than 450,000.

Additionally or alternatively, at said desired third point the respective said Reynolds numbers is less than 700,000.

Additionally or alternatively, at said desired third point the respective said Reynolds numbers is less than 600,000.

Additionally or alternatively, at said desired third point the respective said Reynolds numbers is between 100,000 and 450,000.

Additionally or alternatively, at said desired third point the respective said Reynolds numbers is between 300,000 and 450,000, and the respective said angle of attack is between 5° and 10°.

Additionally or alternatively, the method further comprises causing the air vehicle to change operating conditions from said desired third point to a second desired second point. For example, the method comprises causing the air vehicle to change operating conditions from said desired third point to said second desired said second point by increasing a forward speed of the air vehicle. For example, said second desired said second point is a cruising point in the flight envelope of the air vehicle. For example, the method comprises causing the air vehicle to reach said second desired second point from said desired third point by changing one or both of the respective said angle of attack and the respective said Reynolds numbers in a manner that excludes crossing said first operating boundary into said first operating region.

Alternatively, prior to step (b) the air vehicle has a significant forward speed, the method comprising the step:
  (c) causing the air vehicle to arrive at said desired second point from a nominal said first point corresponding to said significant forward speed.

Alternatively, the method is particularly for operating the air vehicle to arrive at a nominal zero forward speed from a significant forward speed, comprising the step:
  (c) causing the air vehicle to arrive at said desired second point from a nominal said first point corresponding to said significant forward speed.

For example, said significant forward speed is a cruising speed of the air vehicle.

For example, said significant forward speed corresponds to conditions of aerodynamic flight.

For example the method comprises causing the air vehicle to reach said nominal zero forward speed from said significant forward speed by changing one or both of the respective said angle of attack and the respective said Reynolds numbers in a manner that excludes crossing said first operating boundary into said first operating region.

Additionally or alternatively, said fixed wings comprise high lift, mild stall aerofoil sections.

Additionally or alternatively, in said fixed wings comprise a divergent trailing edge.

According to at least some aspects of the presently disclosed subject matter, there is provided an air vehicle having fixed wings and configured for operating as defined above. For example the air vehicle is a UAV, and/or the air vehicle is any one of a VTOL, STOVL and VSTOL air vehicle.

According to at least some aspects of the presently disclosed subject matter, there is provided a method for providing an operating map of angle of attack versus Reynolds number for an air vehicle having fixed wings, comprising:
  providing a first operating region in said operating map comprising a plurality of first points therein, each said first point representing a respective first set of a respective said angle of attack and a respective said Reynolds number, said first operating region defining a first operating boundary comprising a first variation of a maximum Reynolds number limit with said angle of attack;
  providing a second operating region in said operating map comprising a plurality of second points therein, each said second point representing a respective second set of a respective said angle of attack and a respective said Reynolds number, said second operating region defining a second operating boundary comprising a second variation of a minimum Reynolds number limit with said angle of attack;

providing a third operating region in said operating map extending between said first operating boundary and said second operating boundary, said third operating region comprising a plurality of third points therein, each said third point representing a respective third set of a respective said angle of attack and a respective said Reynolds number,
  wherein each said first point in said first region corresponding to conditions of separated flow over the fixed wings irrespective of whether or not the respective said first point was reached from any one of said third points;
  wherein each said second point in said second region corresponding to conditions of attached flow over the fixed wings irrespective of whether or not the respective said second point was reached from any one of said third points; and
  wherein each said third point in said third region corresponding to conditions of attached flow or to conditions of separated flow over the fixed wings, depending on whether the respective said third point was reached from any one of said second points or from any one of said first points, respectively.

For example, the method comprises determining at each of a plurality of angle of attack for the wings, respective hysteresis characteristics of a respective variation of wing lift coefficient with Reynolds number, whereby to identify for each respective said angle of attack the respective said minimum Reynolds number limit and the respective said maximum Reynolds number limit.

For example, at each said angle of attack, the respective said minimum Reynolds number limit corresponds to a Reynolds number at which the rate of change of lift coefficient with Reynolds number suddenly drops when decreasing Reynolds number.

For example, at each said angle of attack, the respective said maximum Reynolds number limit corresponds to a Reynolds number at which the rate of change of lift coefficient with Reynolds number suddenly drops when increasing Reynolds number.

According to at least some aspects of the presently disclosed subject matter, there is provided an operating map, generated according to the method as defined above.

According to at least some aspects of the presently disclosed subject matter, there is provided an operating map of angle of attack versus Reynolds number for an air vehicle having fixed wings, the operating map comprising:
  a first operating region in said operating map comprising a plurality of first points therein, each said first point representing a respective first set of a respective said angle of attack and a respective said Reynolds number, said first operating region defining a first operating boundary comprising a first variation of a maximum Reynolds number limit with said angle of attack;
  a second operating region in said operating map comprising a plurality of second points therein, each said second point representing a respective second set of a respective said angle of attack and a respective said Reynolds number, said second operating region defining a second operating boundary comprising a second variation of a minimum Reynolds number limit with said angle of attack;
  a third operating region in said operating map extending between said first operating boundary and said second operating boundary, said third operating region comprising a plurality of third points therein, each said third point representing a respective third set of a respective said angle of attack and a respective said Reynolds number,
    each said first point in said first region corresponding to conditions of separated flow over the fixed wings irrespective of whether or not the respective said first point was reached from any one of said third points;
    each said second point in said second region corresponding to conditions of attached flow over the fixed wings irrespective of whether or not the respective said second point was reached from any one of said third points; and
    each said third point in said third region corresponding to conditions of attached flow or to conditions of separated flow over the fixed wings, depending on whether the respective said third point was reached from any one of said second points or from any one of said first points, respectively For example, the operating map comprising relationships of angle of attack associated with the fixed wings with Reynolds number, including at conditions of separated flow over the fixed wings and at conditions of attached flow over the fixed wings.

According to at least some aspects of the presently disclosed subject matter, there is provided a computer readable medium that embodies in a tangible manner a program executable for operating an air vehicle, the computer readable medium comprising:
  (a) a first set of data representative of a first operating region in said operating map comprising a plurality of first points therein, each said first point representing a respective first set of a respective said angle of attack and a respective said Reynolds number, said first operating region defining a first operating boundary comprising a first variation of a maximum Reynolds number limit with said angle of attack;
  (b) a second set of data representative of a second operating region in said operating map comprising a plurality of second points therein, each said second point representing a respective second set of a respective said angle of attack and a respective said Reynolds number, said second operating region defining a second operating boundary comprising a second variation of a minimum Reynolds number limit with said angle of attack;
  (c) a third set of data representative of a third operating region in said operating map extending between said first operating boundary and said second operating boundary, said third operating region comprising a plurality of third points therein, each said third point representing a respective third set of a respective said angle of attack and a respective said Reynolds number;
  (d) a fourth set of data representative of as starting condition including a start said angle of attack and a start said Reynolds number, and a fifth set of data representative of an end condition including an end said angle of attack and an end said Reynolds number;
  (e) means for comparing at least a portion of said fourth set of data and said fifth set of data with at least a portion of said first set of data, said second set of data and said third set of data; and
  (f) means for causing the air vehicle to operate at a desired said third point by reaching the desired said third point from a first desired said second point.

For example, the computer readable medium comprises any one of: optical discs, magnetic discs, magnetic tapes.

According to at least some aspects of the presently disclosed subject matter, there is provided a method of operation of air vehicles, in particular for small tactical UAV's (weight in the range between about 10 Kg and about 300 kg), that employ high-lift fixed wings and during its operation, include a mission profile comprising an increase of airspeed from nominally zero to the speed of normal cruising flight, and returning, in some cases, back to zero airspeed at the end of the flight. At very low Reynolds numbers encountered at this type of mission profile, the phenomena of aerodynamics of low Reynolds numbers (for example including: laminar leading edge stall, the burst of laminar separation bubble, development of hysteresis phenomena, etc.) can sometimes distort the aerodynamics characteristics of air vehicle, leading to problems of flight safety and radical degradation of air vehicle performance This is especially the case for UAV with high-lift wings, where there is a tendency for formation of large laminar separation bubbles and bursting of this bubble at certain flight conditions.

According to at least some aspects of the presently disclosed subject matter, there is provided a method of operation of air vehicles, in particular for UAV's, that helps to avoid the region of unfavorable flow phenomena at low Reynolds numbers, helping to ensure safe and undisturbed flight of air vehicle.

According to at least some aspects of the presently disclosed subject matter, providing an operating map with the respective transient corridor defined therein, can be of particular relevance to small tactical UAV, in particular that employ high-lift low Reynolds numbers wings, and more particularly that operate in a speed range starting from nominal zero forward speed and going up to the cruising airspeed, and also operate in the reverse manner, reducing the airspeed from normal operating speed range down to zero speed.

According to at least some aspects of the presently disclosed subject matter, the concept of providing an operating map with the respective transient corridor defined therein can be applied to any suitable air vehicle with a suitable speed envelope.

It is to be noted that the range of low Reynolds numbers associated with the domain of unfavorable phenomena is typically about $0.1*10^6$ to about $0.5*10^6$, and this range of low Reynolds number is very dependent on the specific aerofoil. While the airspeed of the air vehicle is dependent on the weight of air vehicle, wing area, aircraft lift coefficient, the airspeed is not considered a dominant parameter; rather, Reynolds numbers and aerofoil characteristics are considered dominant parameters in defining the transient corridor at low Reynolds numbers.

According to at least some aspects of the presently disclosed subject matter, such air vehicles often require a special design of transient flight path in order to avoid operation of the air vehicle in the region of fully separated flow on the wing, which otherwise can expose the air vehicles to penalties in lift, drag, stability and flight safety of air vehicle.

According to at least some aspects of the presently disclosed subject matter, the transient corridor can be used to establish a safe and/or energy efficient and/or time efficient flight path for many cases of interest.

According to at least some aspects of the presently disclosed subject matter, operation of the air vehicle from zero forward speed includes initially increasing the airspeed at a reduced or even negative angle of attack in order to surpass conditions of separated flow at minimum possible airspeed. Once the operating region of fully attached flow is penetrated (referring to the respective operating map), the air vehicle can safely increase the angle of attack and/or airspeed to realize high-lift capabilities of the wings in a fast an efficient manner.

According to at least some aspects of the presently disclosed subject matter, in order to define the respective transient corridor for specific air vehicle, and for developing one or more operating paths (herein also referred to interchangeably as "transient paths", "transient flight paths") in the operating map for this specific air vehicle, dedicated wind tunnel tests can be preformed for establishment of "lift-on" Reynolds numbers and the "lift-off" Reynolds numbers for the respective aerofoils. Such an experimental procedure can be carried out for any new aerofoil, and the transient flight path can then be adjusted to specific speed envelope of air vehicle. In other words, once a transient flight path is established, it can be transformed into other parameters, for example in terms of airspeeds and lift coefficients, and in any case the transient path should be, ordinarily, compatible with required flight envelope for the air vehicle. For this purpose, it is often useful to use lift coefficients as a parameter in defining the flight path, in the operating map of angles of attack and Reynolds numbers.

Herein, the term "suction peak" refers herein to relatively fast flow acceleration at the leading edge of the aerofoil, producing a spiky pressure distribution.

Herein, the term "blunt leading edge" refers herein to increased thickness and increased local radius of the forward portion of the aerofoil that prevents formation of suction peak at high angles of attack and produces a rounded pressure distribution at the leading edge of the aerofoil.

Herein, the term "mild stall" refers to a type of stall that is characterized by almost constant level of the lift at post-stall domain and is associated with slowly creeping trailing edge separation that moderates the rate of lift losses at high angles of attack, typically resulting in an approximately constant lift coefficient (within about 5% to 10% of the maximum lift coefficient for at least about 5° after the stall angle of attack).

Herein, the term "mild-stall aerofoils" (MS-aerofoils) refers to a class of single-element wing sections aerofoils characterized by the lift curve having a plateau range of lift coefficients at post-stall angles of attack followed by gradual decline of the lift at high post-stall angles of attack. The plateau range and the gradual decline correspond to a gradually developing trailing edge separation of the flow, until total separation of the aerofoil is achieved. Accordingly, it is often possible to more or less maintain the lift generated by the wing at the level of maximum lift, or within about 5% or 10% of maximum lift for example, for a relatively wide range of post-stall angles of attack, typically at least about 5°, 7° or 8° or greater than 8°.

Herein, the term "High-Lift Mild-Stall aerofoils" (HL-MS aerofoils) refers to a special class of mild stall aerofoils that, for any Reynolds number in the range of between about $0.3*10^6$ to about $2.0*10^6$, provide maximum lift $C_{l\ max}$ above the $C_{l\ max}$ for the same Reynolds number according to a minimum boundary line as defined by a linear variation between points of $C_{l\ max}=1.6$ at $Re=0.3*10^6$ and $C_{l\ max}=1.95$ at $Re=2.0.10^6$. This variation serves to differentiate HL-MS aerofoils (providing high lift) from conventional mild stall aerofoils (MS-aerofoils) with moderate maximum lift, wherein conventional mild stall aerofoils, such as for example NACA4415 and its derivatives, achieve maximum lift coefficient below this minimum boundary.

High lift, mild-stall aerofoils according to aspects of the presently disclosed subject matter are generally characterized by relatively high maximum lift relative to conventional mild stall aerofoils, while retaining and enhancing mild stall characteristics in the wide range of post-stall angles of attack. High lift, mild-stall aerofoils according to aspects of the presently disclosed subject matter comprise a blunt leading edge that substantially prevents formation of suction peak at high angles of attack, and can further comprise a highly cambered aft portion of the aerofoil that produces slowly creeping trailing edge separation as angle of attack is increased. Without being subject to theory, the combination of continuous lift build-up at the forward portion of such aerofoils with slowly progressing trailing edge separation produces the feature of mild stall at high level of maximum lift and provides significant advantage relative to conventional MS-aerofoils.

High-lift MS-aerofoils according to aspects of the presently disclosed subject matter enable full velocity range up to stall velocity to be used, for example in the range of Reynolds numbers of Re~$0.3*10^6$ to about $2.0*10^6$. For higher Reynolds numbers greater than about $2.0*10^6$, increased maximum lift of MS-aerofoils comes with a gradual deviation from the feature of mild stall characteristics. For Reynolds numbers below Re~$0.3*10^6$, a special adjustment of aerofoil's contours is required for a better integration with laminar separation bubble and for prevention of laminar stall. In this connection it may be noted that typical Reynolds numbers defined by the minimum airspeeds and wing chords of small and medium size UAV are Re~$0.3$-$2.0*10^6$ or less than about $0.3*10^6$, where laminar-turbulent transition of boundary layers and other aspects of aerodynamics of low Reynolds numbers are normally accounted for in aerodynamic evaluation of an air vehicle.

Herein, the term "Slotted Aerofoil" (SA-aerofoils) refers to two-element aerofoils composed of a first element the main aerofoil body, and a second element (for example in the form of a flap or aileron) segment. The second element of SA-aerofoils is separated from the main body by a slot which is substantially open for the airflow at any deflection of the flap. The separation between the first and second elements can be permanent, or alternatively the aerofoil can be configured with a second element that is reversibly deployable to a position defining the slot. A feature of this structure is that it facilitates actuation of the second element through positive or negative deflection angles. Another feature of this structure is that a box-like relatively rigid construction can be achieved. With the second aerofoil element optionally coupled to actuators, the SA-aerofoils can provide features of adjustable geometry and have built-in options for operating as take-off/landing flaps, ailerons, airbrakes and for providing decambering at maximum speed flight. SA-aerofoils can include mission-adaptive, two-element, high-lift arrangements, and are inherently high-lift aerofoils that can be particularly suitable for development of long endurance UAV and other aircraft, loitering at high lift coefficients. Such basic SA-aerofoils can be designed for cruising/loitering flight at high lift coefficients, and optionally relies on a second element rotation around external hinge point for adjustment of the aerofoil to different flight regimes.

BRIEF DESCRIPTION OF THE DRAWINGS

In order to better understand the subject matter that is disclosed herein and to exemplify how it may be carried out in practice, examples will now be described, by way of non-limiting example only, with reference to the accompanying drawings, in which:

FIG. 3(a) vertical take-off; FIG. 3(b) transient stage; FIG. 3(c) straight level flight; FIG. 3(d) straight level flight; FIG. 3(e) transient stage; FIG. 3(f) vertical landing.

FIG. 5 illustrates a lift curve of aerofoil MS-17/DTE obtained in wind tunnel tests at Reynolds numbers of $0.3*10^6$.

FIGS. 6(a) to 6(d) illustrate pressure distributions for aerofoil MS-17/DTE obtained in wind tunnel tests at Reynolds numbers of $0.3*10^6$: FIG. 6(a) at angle of attack 12° and lift coefficient 2.05; FIG. 6(b) at angle of attack 20° and lift coefficient 2.21; FIG. 6(c) at angle of attack 26° and lift coefficient 2.10; FIG. 6(d) at angle of attack 32° and lift coefficient 1.60.

FIGS. 7(a) and 7(b) illustrate lift coefficient distributions obtained in hysteresis tests of clean aerofoil at Reynolds numbers of $0.3*10^6$ for aerofoil MS-17/DTE: FIG. 7(a) at angle of attack 29°; FIG. 7(b) at angle of attack 32°.

FIGS. 8(a) to 8(d) illustrate pressure distributions obtained in wind tunnel tests at Reynolds numbers of $0.3*10^6$ corresponding to points A to D of FIG. 7(b) FIG. 8(a) point A at angle of attack 32° and lift coefficient 1.64; FIG. 8(b) point B at angle of attack 32° and lift coefficient 1.44; FIG. 8(c) point C at angle of attack 11° and lift coefficient 0.88; FIG. 8(d) point D at angle of attack 10° and lift coefficient 1.96.

FIG. 10(a) at angle of attack 17° and Reynolds numbers of $0.2*10^6$; FIG. 10(b) at angle of attack 18° and Reynolds numbers of $0.2*10^6$; FIG. 10(c) at angle of attack 2° and Reynolds numbers of $0.1*10^6$; FIG. 10(d) at angle of attack 3° and Reynolds numbers of $0.1*10^6$.

FIG. 14(a) point A at angle of attack 24° and lift coefficient 2.03; FIG. 14(b) point B at angle of attack 25° and lift coefficient 1.17; FIG. 14(c) point C at angle of attack 9° and lift coefficient 0.85; FIG. 14(d) point D at angle of attack 8° and lift coefficient 1.82.

FIGS. 16(a) to 16(e) illustrate pressure distributions corresponding to points a to e of FIGS. 15(a) and 15(b) at angle of attack constant 12°: FIG. 16(a) point a at Reynolds numbers of $0.08*10^6$ and lift coefficient 0.95; FIG. 16(b) point b at Reynolds numbers of $0.32*10^6$ and lift coefficient 0.91; FIG. 16(c) point c at Reynolds numbers of $0.34*10^6$ and lift coefficient 2.06; FIG. 16(d) point d at Reynolds numbers of $0.16*10^6$ and lift coefficient 1.97; FIG. 16(e) point e at Reynolds numbers of $0.14*10^6$ and lift coefficient 0.96.

FIG. 18(a) point a at Reynolds numbers of $0.08*10^6$ and lift coefficient 0.56; FIG. 18(b) point b at Reynolds numbers of $0.12*10^6$ and lift coefficient 0.64; FIG. 18(c) point c at Reynolds numbers of $0.14*10^6$ and lift coefficient 1.38; FIG. 18(d) point d at Reynolds numbers of $0.12*10^6$ and lift coefficient 1.35; FIG. 18(e) point e at Reynolds numbers of $0.10*10^6$ and lift coefficient 0.60.

FIG. 29 illustrates in front, side, top and isometric views an AK-60 configuration V2 UAV having wings corresponding to the example of FIGS. 22(a) and 22(b).

NOMENCLATURE $c_L^{1.5}/C_D$—aircraft endurance factor
$C_L$—aircraft lift coefficient
$C_d$—aerofoil drag coefficient
$C_l$—aerofoil lift coefficient
$C_l$max—aerofoil maximum lift
$R_e$—Reynolds number
$C_p$—pressure coefficient
$t/c$—thickness ratio
$x/c$—chord fraction
$\alpha$—angle of attack
$\phi$—trailing edge divergence angle
$(t/c)_{max}$—maximum thickness ratio
j trailing edge base thickness
AR—aspect ratio
MS—mild stall
SA—slotted aerofoil
UAV—unmanned air vehicle
W—weight

DETAILED DESCRIPTION

Figure 1A:
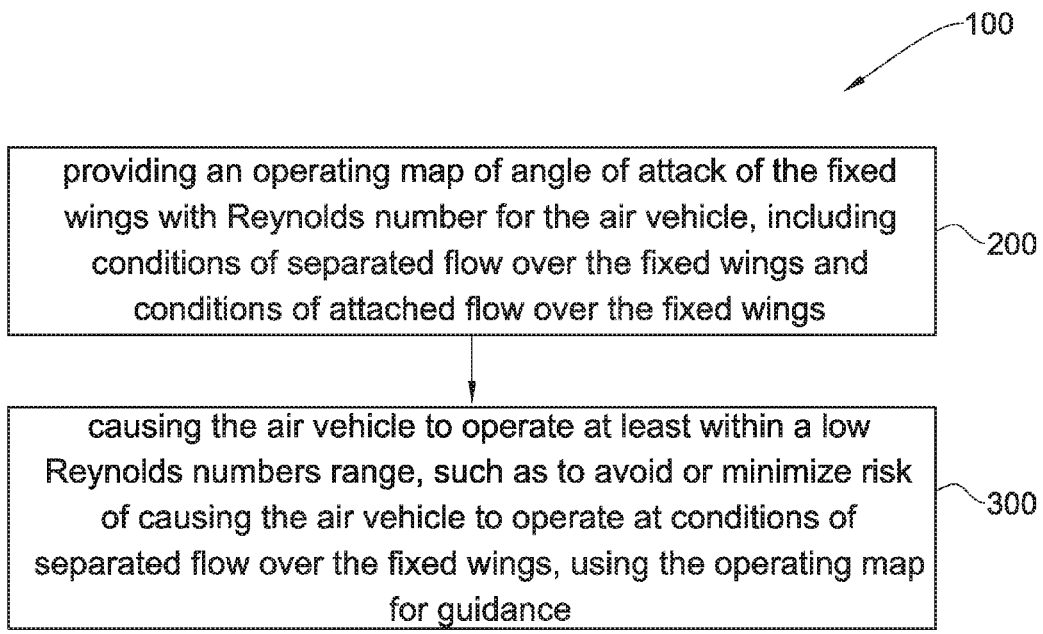
FIG. 1(a) schematically illustrates a method for operating an air vehicle having fixed wings, according to an example of the presently disclosed subject matter.

Referring to FIG. 1(a), a method for operating an air vehicle having fixed wings, according to a first example of the presently disclosed subject matter, generally designated 100, comprises the following general steps:

Step 200—providing an operating map of angle of attack of the fixed wings with Reynolds number for the air vehicle, including conditions of separated flow over the fixed wings and conditions of attached flow over the fixed wings Step 300—causing the air vehicle to operate at least within a low Reynolds numbers range corresponding to the operating map, such as to avoid or minimize risk of causing the air vehicle to operate at conditions of separated flow over the fixed wings, using the operating map for guidance.

Step 300 can be of particular significance during certain critical phase in the flight envelope of the air vehicle, for example take-off or landing for conventional type air vehicles, including STOL air vehicles. Referring to FIGS. 3(a) to 3(f), in the case of air vehicles having vectored thrust capability, in particular VTOL or VSTOL air vehicles, Step 300 can also be of particular significance during certain critical phase of the flight envelope of the air vehicle, for example including transition between vertical vectored thrust and horizontal aerodynamic flight, for example in flight stages of a VTOL or VSTOL air vehicle, when taking off vertically or when landing vertically.

Figure 2A:
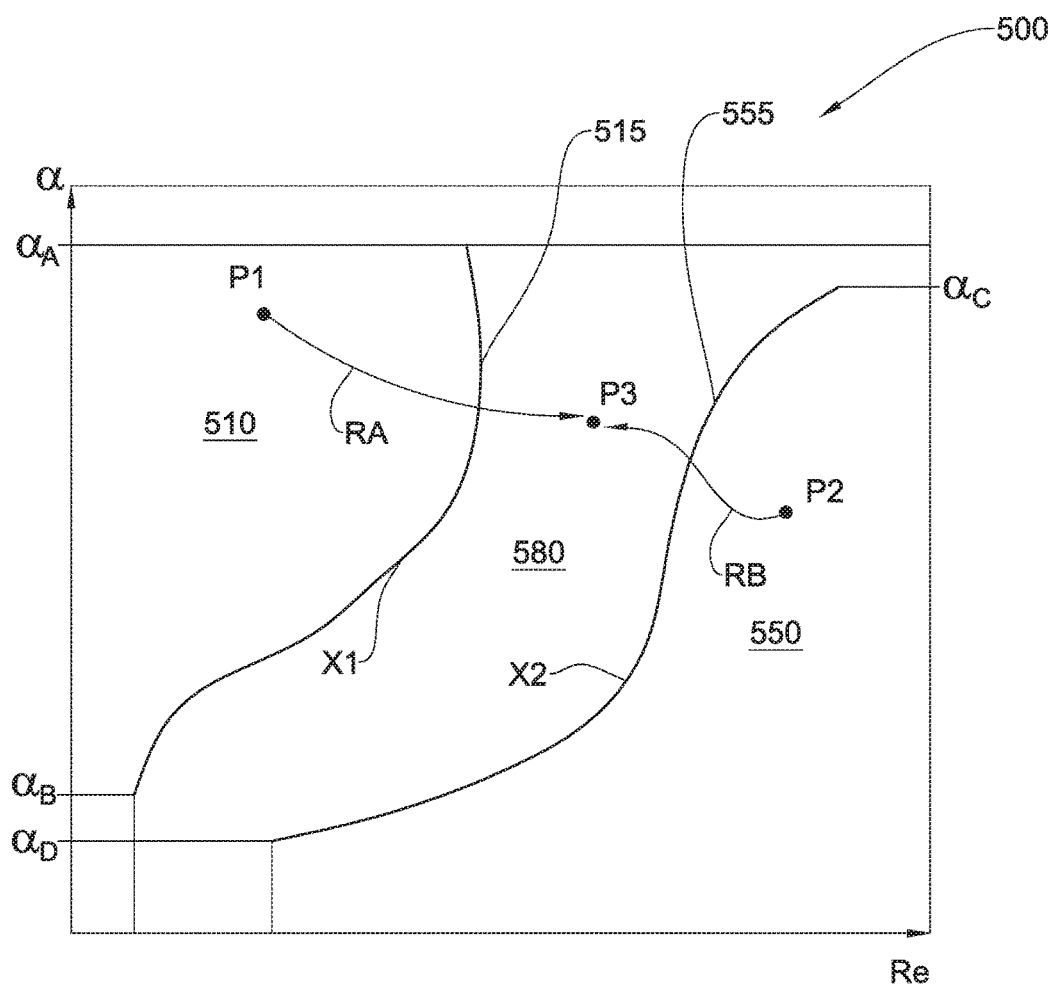
FIG. 2(a) schematically illustrates an operating map, according to an example of the presently disclosed subject matter.

FIG. 2(a) schematically illustrates an example of an operating map 500 of angle of attack $\alpha$ of the fixed wings of a particular air vehicle, versus Reynolds number Re for the air vehicle, provided in Step 200.

In this example, the operating map 500 is essentially a two-dimensional Cartesian representation or other suitable graphical representation having two orthogonal axes, in which one axis (for example the x-axis, for convenience) is the Reynolds number Re axis, and the other axis (for example the y-axis, for convenience) is the angle of attack $\alpha$ axis. In alternative variations of this example, other mapping systems or representations can be used, for example a map based on a polar coordinate system.

It is to be noted that when referring to the operating map, the "angle of attack of the fixed wings" can refer to the angle of attack of an aerofoil section representative of the fixed wings, or can refer to the angle of attack of the three-dimensional fixed wings themselves, or can refer to the angle of attack of the fixed wings when fixed on the air vehicle.

The operating map 500, together with one or more transient paths therein, can be provided in physical form, for example printed or otherwise depicted on a paper or on some other suitable substrate. Alternatively, the operating map 500, together with one or more transient paths therein (in particular, as these relate to the flight envelope), can be provided in electronic form in the memory or processor of a computer (for example as software including one or more of: a table of values, algorithms, flight control laws, and so on) operatively connected to (or integrally part of) the controller (for example the airborne computer) of the air vehicle to enable the air vehicle to be operated at conditions represented by various regions in the operating map 500, as will become evident herein.

Figure 3A:
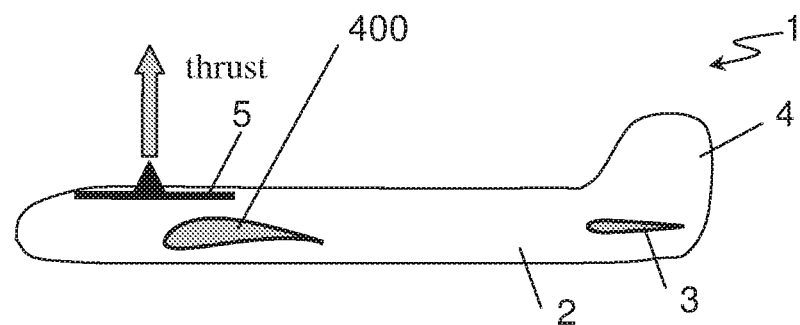
FIGS. 3(a) to 3(f) illustrate an example of a fixed-wing air vehicle according to the presently disclosed subject matter in various flight modes, including transition from vertical take-off to straight level flight (FIGS. 3(a) to 3(c)), and transition from straight level flight to vertical landing (FIGS. 3(d) to 3(f))
Figure 3B:
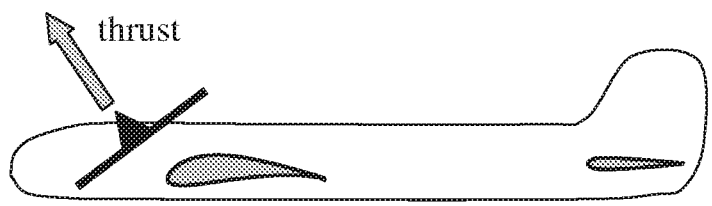
Figure 3C:
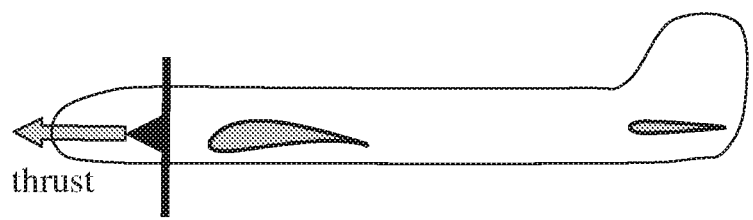
Figure 3D:
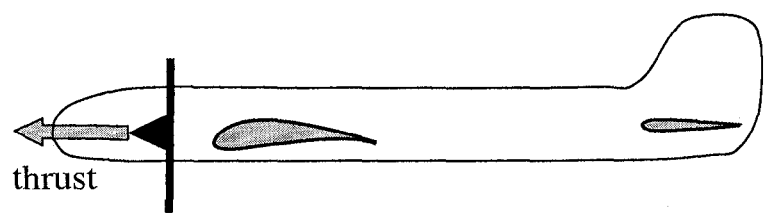
Figure 3E:
Figure 3F:
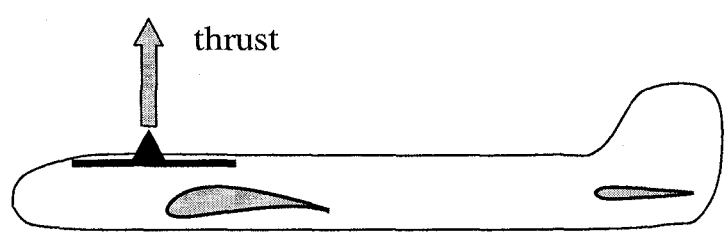

For the purpose of example, and referring to FIG. 3(a), such an air vehicle is described herein as a fixed-wing aircraft, generally designated with numeral 1, of a regular subsonic configuration, having a fuselage section 2, main wings 400 (only the starboard wing (also referred to herein as a "wing half") is illustrated in this figure), tailplane 3, vertical stabilizer 4, and a propulsion system 5. Furthermore, and referring also to FIGS. 3(b) to 3(e), in this example, the air vehicle is a Vertical Take Off and Landing (VTOL) air vehicle, or a Vertical and/or Short Take Off and Landing (VSTOL) air vehicle, or a Short Take Off and Vertical Landing (STOVL) air vehicle, in which the propulsion system 5 is configured for providing thrust that is vectorable at least between a vertical thrust vector and a horizontal thrust vector. For example, the propulsion system 5 comprises a plurality of swivel engines which provide vectored thrust by rotating the engines about a pitch axis.

However, the presently disclosed subject matter is applicable to other types of air vehicles, for example conventional aircraft that take off and land conventionally, from a runway for example or including catapult assisted takeoff, including for example: gliders; subsonic/transonic aircraft; air vehicles having canards rather than a tailplane; general aviation aircraft, and so on.

Furthermore, while the presently disclosed subject matter finds particular application in UAV aircraft, particularly light or tactical UAV, the presently disclosed subject matter can also be applied to manned aircraft, mutatis mutandis, in particular to general aviation, sailplanes, subsonic transport, naval aviation, and so on.

Figure 22A:
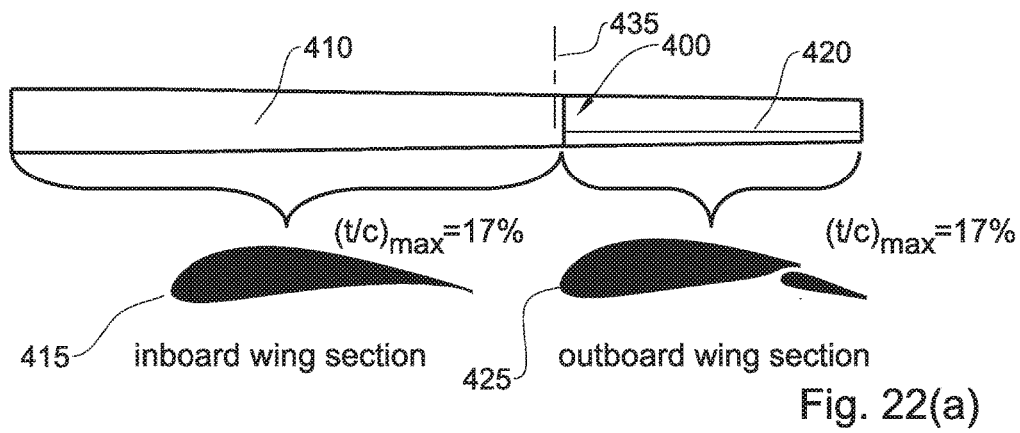
FIG. 22(a) illustrates in plan view and sample cross-sections a wing half of an example of an air vehicle according to aspects of the presently disclosed subject matter.

Referring also to FIG. 22(a), each wing half 400 comprises an outboard section 420 joined to or integral with an inboard section 410. The outboard section 420 can be defined as extending from the wing tip to a transition plane 415, while the inboard section 410 extends from the transition plane 415 to the wing root.

Figure 1B:
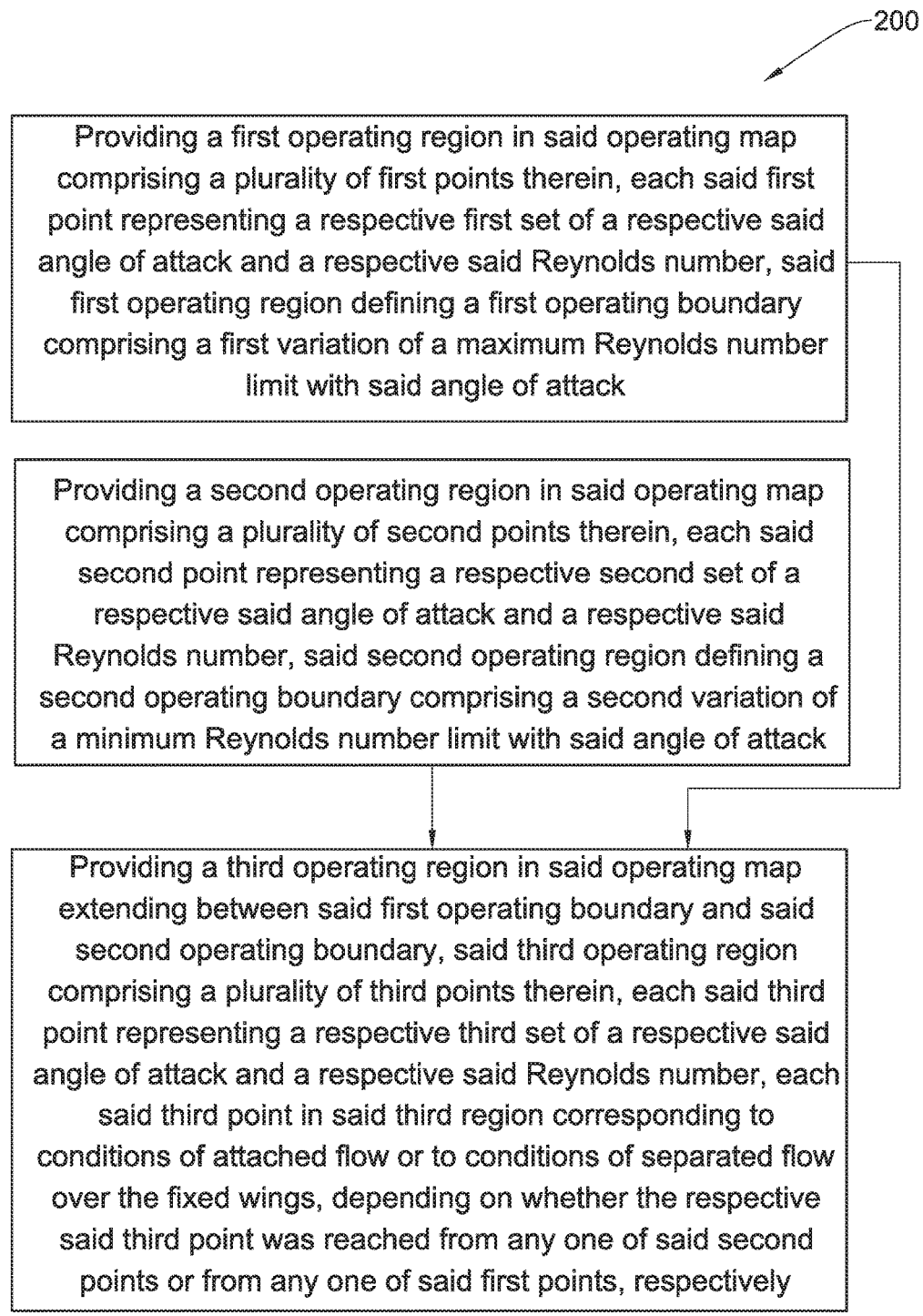
FIG. 1(b) schematically illustrates a method providing an operating map, according to an example of the presently disclosed subject matter.

Referring to FIG. 1(b) and FIG. 2(a), operating map 500 comprises a first operating region 510, a second operating region 550 and a third operating region 580, provided in step 200.

The first operating region 510 in operating map 500 comprises a plurality of first points P1 therein. Each such first point P1 represents a respective first set ($\alpha 1$, Re1) of an angle of attack $\alpha 1$ and a corresponding Reynolds number Re1 at this particular first point P1. Each such first point P1 in the first region 510 corresponds to conditions of separated flow over the fixed wings of the air vehicle, irrespective of whether or not the angle of attack $\alpha 1$ and the corresponding Reynolds number Re1 of the respective first point P1 were reached from the third operating region 580.

The first operating region 510 also defines a first operating boundary 515, comprising a first variation X1 of a maximum Reynolds number limit with angle of attack $\alpha$, for a range of angle of attack between an upper limit at angle of attack $\alpha_A$ to a lower limit at angle of attack $\alpha_B$. The first operating boundary 515 thus represents a line of demarcation between the first operating region 510 and the third operating region 580.

Herein, the respective maximum Reynolds number limit for a particular angle of attack $\alpha$ is also referred to as the "lift-off" Reynolds number, being the Reynolds number at which, for the particular angle of attack, the lift decreases sharply. Correspondingly, the first variation X1 is also referred to interchangeably herein as the variation of lift-off Reynolds numbers with angle of attack.

Thus, for all first points P1 in the first operating region 510, i.e., at any given angle of attack $\alpha$ between $\alpha_A$ and $\alpha_B$, and for Reynolds numbers at or lower than the Reynolds number corresponding to the maximum Reynolds number limit of first variation X1 at the aforesaid given angle of attack, the flow over the fixed wings of the air vehicle is always separated. Such separated flow conditions at each first point P1 are thus irrespective of and independent of whether the respective angle of attack $\alpha 1$ at the respective first point P1 was reached by arriving at respective angle of attack $\alpha 1$ from a higher angle of attack or from lower angle of attack, and/or, irrespective of and independent of whether the respective Reynolds number Re1 at the respective first point P1 was reached by arriving at respective Reynolds number Re1 from a higher Reynolds number or from lower Reynolds number.

The second operating region 550 in operating map 500 comprises a plurality of second points P2 therein. Each such second point P2 represents a respective second set ($\alpha 2$, Re2) of an angle of attack $\alpha 2$ and a Reynolds number Re2 at this particular second point P2. Each such second point P2 in the second region 550 corresponds to conditions of attached flow over the fixed wings of the air vehicle, irrespective of whether or not the respective second point P2 was reached from the third operating region 580.

The second operating region 550 also defines a second operating boundary 555, comprising a second variation X2 of a minimum Reynolds number limit with angle of attack $\alpha$, for a range of angle of attack between an upper limit at angle of attack $\alpha_C$ to a lower limit at angle of attack $\alpha_D$. The second operating boundary 555 thus represents a line of demarcation between the second operating region 550 and the third operating region 580.

Herein, the respective minimum Reynolds number limit for a particular angle of attack $\alpha$ is also referred to as the "lift-on" Reynolds number, being the Reynolds number at which, for the particular angle of attack, the lift increases sharply. Correspondingly, the second variation X2 is also referred to interchangeably herein as the variation of lift-on Reynolds numbers with angle of attack.

Thus, for all second points P2 in the second operating region 550, i.e., at any given angle of attack $\alpha$ between $\alpha_C$ and $\alpha_D$, and for Reynolds numbers at or greater than the Reynolds number corresponding to the minimum Reynolds number limit of second variation X2 at the aforesaid given angle of attack, the flow over the fixed wings of the air vehicle is always attached. Such attached flow conditions at each second point P2 is irrespective of and independent of whether the respective angle of attack $\alpha$2 at the respective second point P2 was reached by arriving at respective angle of attack $\alpha$2 from a higher angle of attack or from lower angle of attack, and/or, irrespective of and independent of whether the respective Reynolds number Re2 at the respective second point P2 was reached by arriving at respective Reynolds number Re2 from a higher Reynolds number or from lower Reynolds number.

The third operating region 580 in the operating map 500 extends between the first operating boundary 515 and the second operating boundary 555. In other words, the third operating region 580 separates the first operating region 510 from the second operating region 550. The third operating region 580 comprises a plurality of third points P3 therein.

Each such third point P3 represents a respective third set ($\alpha$3, Re3) of an angle of attack $\alpha$3 and a Reynolds number Re3 at this particular third point P3.

Each such third point P3 in the third region 580 corresponds to conditions of attached flow or to conditions of separated flow over the fixed wings, depending on whether the respective third point P3 was reached from any one of the second points P2 (i.e., from the second region 550), or whether the respective said third point P3 was reached from any one of the first points P1 (i.e., from the first region 510), respectively.

The first region 510 thus represents fully separated flow over the wings, for all combinations of Reynolds numbers and angle of attack in the first region 510. Without being bound to theory, it is considered that at conditions represented by the first region 510, leading edge laminar stall produces flow separation at the suction surface of the wings, and this is accompanied by a reduced level of lift and a high rate of energy dissipation (corresponding to high levels of drag). According to aspects of the presently disclosed subject matter, drastic change in flight conditions is then required to recover lift and drag characteristics.

Conversely, the second region 550 represents conditions of fully attached flow over the suction and pressure surfaces of the wings for all combinations of Reynolds numbers and angle of attack in the second region 550. Without being bound to theory, it is considered that a burst of laminar separation bubble stall and the corresponding collapse of lift characteristics for the particular wings of the air vehicle cannot occur at any one of the combinations of Reynolds numbers and angle of attack (i.e., at any of the second points P2) in the second region 550.

The third region 580 is also interchangeably referred to herein as a "transient corridor". For combinations of Reynolds numbers and angle of attack (i.e., at any of the third points P3) in the third region 580, the flow over the wings can be either fully separated or fully attached, depending on the starting point of the flight, i.e., the particular starting combination of Reynolds numbers and angle of attack from which point P3 is reached.

For example, if the air vehicle is initially operating at a combination of Reynolds numbers Re1 and angle of attack $\alpha$1 corresponding to a first point P1 (i.e., operating at conditions in the first operating region 510), and the Reynolds numbers and/or angle of attack are progressively changed to correspond to a combination of Reynolds numbers Re3 and angle of attack $\alpha$3 of a point P3 (i.e., in the third region 580), the conditions of separated flow characteristic of the first region 510 continue with respect to wings at the respective combinations of Reynolds numbers and angle of attack in the third region 580. Such conditions of separated flow remain until Reynolds numbers and/or angle of attack are progressively changed to correspond to a combination of Reynolds numbers Re2 and angle of attack $\alpha$2 in the second region 550 (graphically, when the second operating boundary 555 is reached), at which point the flow over the wings becomes attached, followed by lift recovery and a significant reduction in drag. In such cases, the first operating region 510 is effectively extended to the second operating boundary 555.

In graphical terms, the air vehicle is operating at conditions of separated flow at a third point P3 in the third region 580, if this third point P3 was reached by penetrating into the third region 580 from the first region 510 via the first operating boundary 515 to reach this third point P3, for example via route RA.

Conversely, for example, if the air vehicle is initially operating at a combination of Reynolds numbers Re2 and angle of attack $\alpha$2 corresponding to a second point P2 (i.e., operating at conditions in the second operating region 550), and the Reynolds numbers and/or angle of attack are progressively changed to correspond to a combination of Reynolds numbers Re3 and angle of attack $\alpha$3 of a point P3 (i.e., in the third region 580), the conditions of attached flow characteristic of the second region 550 continue with respect to wings at the respective combinations of Reynolds numbers and angle of attack in the third region 580. Such conditions of attached flow remain until Reynolds numbers and/or angle of attack are progressively changed to correspond to a combination of Reynolds numbers Re1 and angle of attack $\alpha$1 in the first operating region 510 (graphically, when the first operating boundary 515 is reached), at which point the flow over the wings becomes separated, followed by a drop in lift and a significant increase in drag. In such cases, the second operating region 550 is effectively extended to the first operating boundary 515.

In graphical terms, referring to the operating map 500, the air vehicle is operating at conditions of attached flow at a third point P3 in the third region 580, if this third point P3 was reached by penetrating into the third region 580 from the second operating region 550 via the second operating boundary 555 to reach this third point P3, for example via route RB.

According to at least one aspect of the presently disclosed subject matter, the operating map 500 can be created as follows.

The wings 400 of the air vehicle are tested (while attached to the air vehicle, or separately from the air vehicle) at each one of a plurality of angles of attack α, within a desired range $\alpha_0$ to $\alpha_n$. This range $\alpha_0$ to $\alpha_n$ should preferably include the ranges $\alpha_A$ to $\alpha_B$, and $\alpha_C$ to $\alpha_D$. (As already mentioned, the angle of attack α can ultimately refer to the angle of attack of an aerofoil section representative of the fixed wings, or can refer to the angle of attack of the three-dimensional fixed wings themselves, or can refer to the angle of attack of the fixed wings when fixed on the air vehicle.)

At each such angle of attack α in this range $\alpha_0$ to $\alpha_n$, the respective variation of wing lift coefficient $C_1$ with Reynolds number Re is determined for a Reynolds number range $Re_0$ to $Re_m$.

For example, the starting Reynolds number $Re_0$ can be the lowest Reynolds number at which such testing is possible, for example corresponding nominally to zero relative velocity between the airstream and the wings. This lower limit of Reynolds number $Re_0$ is, in general and as much as is practical, sufficiently small to ensure that conditions of the first operating region 510 prevail at this Reynolds number $Re_0$. In some cases, such as for example at some range of negative angles of attack, it may not be possible to obtain conditions of the first operating region 510 at any practical Reynolds number Re for the particular wings. For example, in some wind tunnels there are difficulties relating to performing reliable testing at very low Reynolds numbers. In addition, for at least some clean aerofoils at very low Reynolds numbers, for example $0.1*10^6$, abrupt stall can be encountered at a low angle of attack (see for example FIG. 9 ~Re=100K), limiting lift operating range. It is also to be noted that for flight at small lift coefficients, the stall of the wing at negative angles of attack at all Reynolds numbers should be accounted for, considering also a safety margin (FIG. 9); furthermore, at some very low Reynolds numbers, some aerofoils are fully separated at all angles of attack, and the corresponding air vehicle is not capable of aerodynamic flight at such conditions. Thus, for very low Reynolds numbers, there is a limited lift operating range, making it impractical to fly in this regime with wings based on some types of aerofoils, for example the aerofoil illustrated in FIG. 22(b); however, this is not always the case, for example with wings based on aerofoils with reduced thickness and a moderate camber level, in which the third operating region can be extended to even lower Reynolds numbers.

The upper limit of Reynolds number $Re_m$ is, as much as is practical, sufficiently large to ensure that conditions of the second operating region 550 prevail at this Reynolds number $Re_m$. In some cases, such as for example at extremely large angles of attack, it may not be possible to obtain conditions of the second operating region 550 at any Reynolds number Re for the particular wings.

It is to be noted that while for the aerofoil illustrated in FIG. 22(a), which is a high-lift, mild-stall aerofoil, and the second operating region 550 was established up to high post-stall angles of attack (see FIG. 21), the presently disclosed subject matter is not limited to high-lift, mild-stall aerofoils. The concept of providing an operating map with a "transient corridor" as disclosed herein can in general be applicable to any aerofoil operating at low Reynolds numbers with variation of airspeed from zero airspeed to normal cruising airspeed, for example, and back from cruising airspeed to zero airspeed. It is also to be noted that with conventional subsonic aerofoil, i.e., aerofoils that do not exhibit mild-stall characteristics and instead generally follow conventional moderate stall pattern characteristics, the characteristics of the aerofoil at large angles of attack are, in practice, not relevant since the corresponding air vehicle is not allowed, conventionally, to operate in this upper range of angles of attack due to the imposed speed safety margin.

Testing of the air vehicle wings between the lower limit of Reynolds number $Re_0$ and the upper limit of Reynolds number $Re_m$ can be carried out for example at suitable Reynolds number intervals, to provide the desired resolution in the results.

Such testing can be carried out, for example, in any suitable wind tunnel facility, as is known in the art, in which the wings can be mounted to the working section of the wind tunnel at any one of a variety of angles of attack in the desired range $\alpha_0$ to $\alpha_n$, and in which at each angle of attack setting, the Reynolds number can be controllably varied (by selectively increasing the Reynolds number and also be selectively decreasing the Reynolds number) in the range $Re_0$ to $Re_m$.

In particular, at each angle of attack α, the hysteresis characteristics of the respective variation of wing lift coefficient $C_1$ with Reynolds number Re is determined For example, the variation of wing lift coefficient $C_1$ with Reynolds number Re is determined as Reynolds number Re is increased from the lower limit of Reynolds number $Re_0$ to the upper limit of Reynolds number $Re_m$; thereafter the variation of wing lift coefficient $C_1$ with Reynolds number Re is determined as Reynolds number Re is decreased back to the lower limit of Reynolds number $Re_0$. Alternatively, at each angle of attack α, the hysteresis characteristics of the respective variation of wing lift coefficient $C_1$ with Reynolds number Re can be determined, by determining the variation of wing lift coefficient $C_1$ with Reynolds number Re as Reynolds number Re is first decreased from the upper limit of Reynolds number $Re_m$ to the lower limit of Reynolds number $Re_0$, and subsequently as Reynolds number Re is increased back to the upper limit of Reynolds number $Re_m$.

Figure 4:
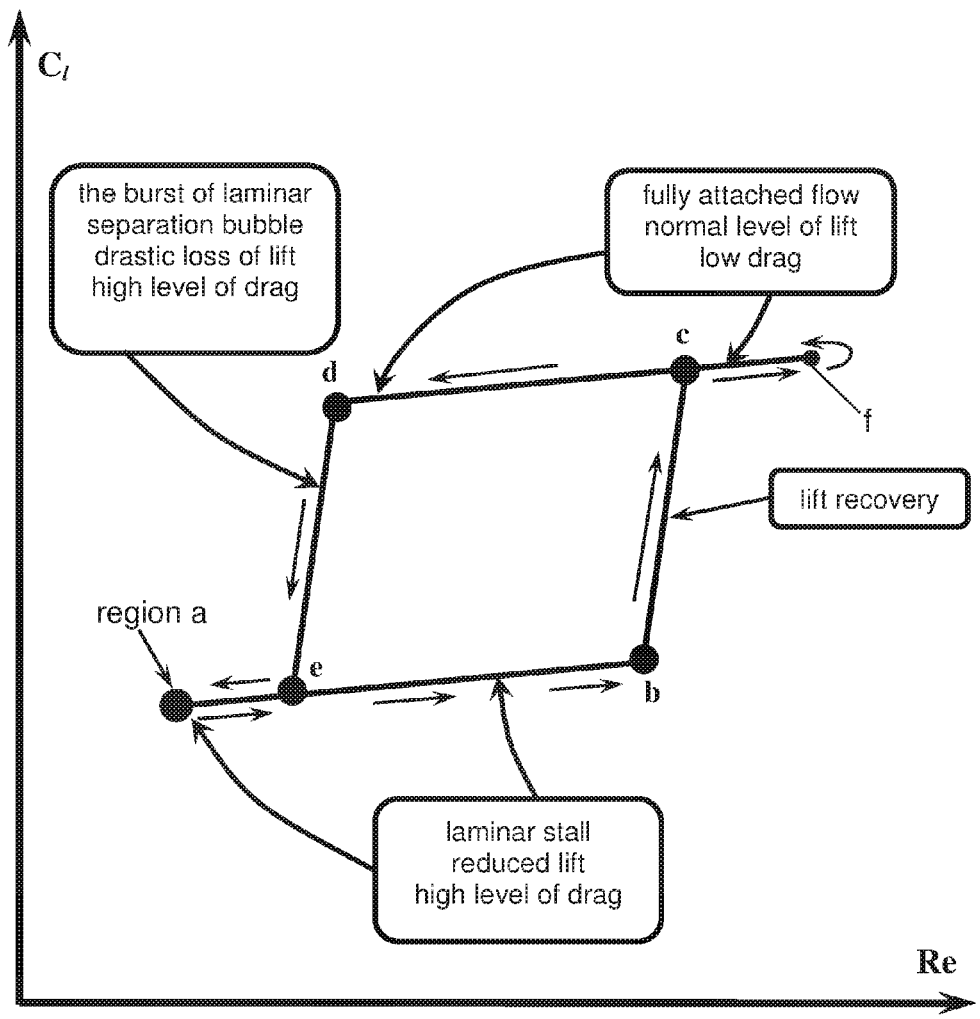
FIG. 4 schematically illustrates a variation of lift coefficient with Reynolds numbers illustrating lift-on, lift-off Reynolds numbers of typical aerofoil at a range of low airspeeds, with angle of attack constant.

Such $C_1$~Re hysteresis characteristics, for a particular angle of attack α, is schematically illustrated in FIG. 4. At very low Reynolds numbers (region a) the flow over the wings is fully separated, providing a low level of lift and high drag. Without being subject to theory, the inventors consider that the type of flow separation in region a is laminar stall that starts at the leading edge of the wings. As Reynolds numbers is increased (maintaining the angle of attack constant), the conditions of separated flow (i.e., laminar stall) remain up to a relatively high Reynolds number, indicated at point b in FIG. 4. For example, for VTOL or VSTOL air vehicles, such as for example UAV's operating at vertical take off mode, the Reynolds number range of region a to point b corresponds to a stage in the flight envelope of initial horizontal acceleration with partially vectored thrust, for example partially rotated engines nacelles (see FIG. 3(b)), and according to aspects of the presently disclosed subject matter this stage should in general be overcome as fast as possible in order to achieve fully attached flow and levels of lift and drag associated with aerodynamic flight.

As Reynolds numbers is further increased beyond point b, there is a fast recovery of the lift to levels of lift associated with aerodynamic flight, indicated at point c in FIG. 4, and without being subject to theory, the inventors consider that there is a sudden reattachment of the separated flow, leading to this lift recovery.

As Reynolds numbers is further increased beyond point c, for example to point f, lift recovery is sustained, indicating that the flow over the wings remains fully attached.

For example, for VTOL or VSTOL air vehicles, such as for example UAV's, and according to aspects of the presently disclosed subject matter the stage in the flight envelope of final horizontal acceleration with the vectored thrust being horizontal (for example fully horizontally rotated engines) should be performed at the Reynolds number corresponding to the region from point b to beyond (for that particular angle of attack).

As Reynolds numbers is now decreased, for example from point f, the high levels of lift are now maintained past point c, and until point d, which is at a lower Reynolds number than point c. At lower Reynolds numbers beyond point d there is an abrupt loss of lift and an accompanying rise in the level of drag. Without being subject to theory, the inventors consider that attached flow conditions of points f and c remain until point d is reached, wherein the collapse in lift coefficient is due to flow separation (again, due to the burst of laminar separation bubble and laminar stall that starts at the leading edge of the wings). For example, for VTOL or VSTOL or STOVL air vehicles, such as for example UAV's, the transient stage in the flight envelope of vertical take-off and/or vertical landing should be performed at the Reynolds number greater than that corresponding to point d, and in particular greater than the Reynolds number corresponding to point d (for that particular angle of attack), according to aspects of the presently disclosed subject matter.

Thus, at each angle of attack the respective minimum Reynolds number limit and the respective maximum Reynolds number limit is determined. The respective minimum Reynolds number limit corresponds to a Reynolds number at which the rate of change of lift coefficient with Reynolds number suddenly drops when decreasing Reynolds number. The respective maximum Reynolds number limit corresponds to a Reynolds number at which the rate of change of lift coefficient with Reynolds number suddenly increases when increasing Reynolds number.

Clearly, for the particular angle of attack corresponding to FIG. 4, point d corresponds to the respective maximum Reynolds number limit X1 of the operating map 500 illustrated in FIG. 2(a), while point c corresponds to the respective minimum Reynolds number limit X2 of the operating map 500 illustrated in FIG. 2(a). Similarly, region a up to point d corresponds to the first operating map region 510, while point c and beyond (e.g. to point f) corresponds to the second operating region 550.

Thus, by providing the corresponding points d and c obtained for the wings at each angle of attack in the range $\alpha_0$ to $\alpha_n$, the maximum Reynolds number limit X1 and the minimum Reynolds number limit X2 of the operating map 500 illustrated in FIG. 2(a) can be constructed, thereby providing the first operating map region 510, the second operating region 550 and the third operating region 580.

Once the operating map 500 is available for a particular air vehicle, according to Step 300 the air vehicle can be caused to operate at least at a low Reynolds numbers range by using the operating map 500 for guidance, such as to avoid or minimize risk of causing the air vehicle to operate at conditions of separated flow over the fixed wings. In particular, the operating map 500 can be used, when starting at conditions corresponding to the first operating region 510, to cause the air vehicle to operate at a desired third point P3 (i.e., in the third operating region 580) by reaching the desired third point P3 from a second point P2. For example, navigating (in a graphical sense) through the operating map 500 in this manner can allow the air vehicle to reach Reynolds numbers past stall or to Reynolds numbers required for sustained aerodynamic flight in an energy efficient manner, avoiding operating in the third operating region 580 under conditions of separated flow (which correspond to low lift and high drag conditions), and instead ensuring operating in the third operating region 580 under conditions of attached flow, providing high lift and low drag.

Thus, for example, when starting at low Reynolds number corresponding to the first operating region 510, the angle of attack and/or the Reynolds number are controlled to bring the air vehicle to operate in the second operating region 550 as quickly as possible to ensure fully attached flow, and then the angle of attack and/or the Reynolds number are controllably changed to bring the air vehicle to operate in the third operating region 580 from conditions in the second operating region 550, to achieve a particular goal such as for example sustaining horizontal aerodynamic flight. For example, in this manner it is possible to effectively extend the favorable lift conditions of the second operating region 550 into the third operating region 580, and at least in some cases to attain the required lift force at the relatively low Reynolds numbers and angle of attack corresponding to the third operating region 580, which would not otherwise be possible.

It is to be noted that for at least some air vehicles, the second variation X2 of minimum Reynolds number limit with angle of attack $\alpha$, has a generally positive slope (as seen on the respective operating map) at least at the lower end of the Reynolds number range, and thus the second operating region 550 exists at low Reynolds numbers, but when coupled with low or negative angles of attack. Thus, one way of quickly establishing conditions of attached flow characteristic of the second operating region 550, even while the air vehicle is moving slowly (and thus Reynolds numbers are low), is to provide a low or negative angle of attack as, or even before, the air vehicle beings to accelerate horizontally. As soon as the air vehicle is operating in the second operating region, the angle of attack and Reynolds numbers can then be increased as swiftly as possible to increase the lift generated by the wings to allow for aerodynamic flight, ensuring that during this stage the angle of attack is not increased so quickly that effectively crosses the first operating boundary 515 into the first operating region 510 and thus the air vehicle begins to operate in the first region again.

It is to be noted that operating the air vehicle in this manner, providing low or negative angles of attack as the vehicle begins to accelerate, is counter intuitive, as in general such angles of attack are associated with low levels of lift.

Figure 22B:
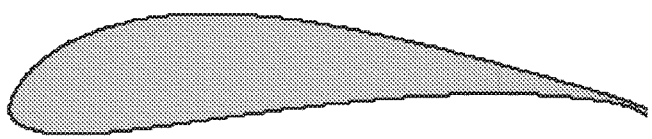
FIG. 22(b) illustrates a wing section of part of the wing half example of FIG. 22(a) based on aerofoil MS-17/DTE geometry, a combination of mild-stall airfoil and divergent trailing edge (DTE)

It is to be noted that in the case of high-lift, mild-stall aerofoil (for example the aerofoil illustrated in FIG. 22(b)), such aerofoils typically have a tendency for the formation of large laminar separation bubbles at low Reynolds numbers, and a tendency for dramatic changes in the lift and drag characteristics when there is a burst of the laminar bubble (or sudden lift and drag recovery from the state of fully separated aerofoil with increasing Reynolds numbers). Accordingly, and referring to FIG. 2(a), for such aerofoils the first variation X1 and the second variation X2 will tend to be located at the higher end of low Reynolds numbers, and provide a significant gap between the first variation X1 and the second variation X2, corresponding to the transient corridor. Without being bound to theory, the inventors consider that for conventional aerofoils having a design point at low Reynolds number (i.e., designed having moderate maximum lift, reduced thickness, low camber level, and so on), the first variation X1 and the second variation X2 will be shifted towards the lower end of low Reynolds numbers, with a narrower gap being provided between the first variation X1 and the second variation X2, as compared with FIG. 2(a), with a narrower transient corridor.

According to at least one aspect of the presently disclosed subject matter, the operating map 500 can be used, for example as follows, for operating an air vehicle.

Figure 2B:
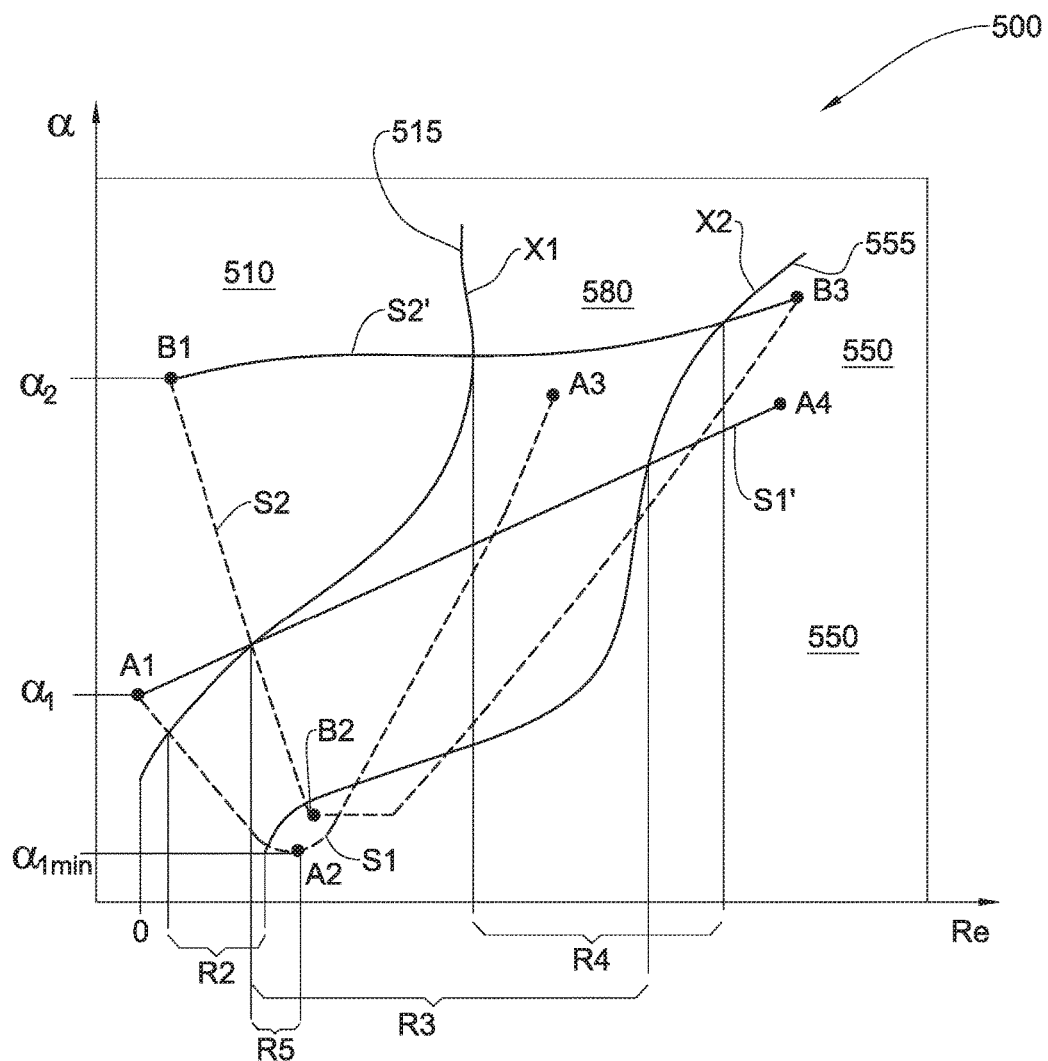
FIG. 2(b) schematically illustrates the operating map of the example of FIG. 2(a) further illustrating examples of transient paths therein.

FIG. 2(b) graphically illustrates Step 300 as applied to the corresponding air vehicle at nominal zero forward speed (and thus at Re=0), for example at hover or on the runway. According to an aspect of the presently disclosed subject matter, the air vehicle, in one example, is caused to operate according to path S1. In this example, operating path S1 starts at point A1, with the air vehicle having its wings at an angle of attack α1 at zero forward speed; as the vehicle is accelerated to reach a relatively low Reynolds number the angle of attack is sharply reduced to angle of attack $α_{1min}$, to effectively cross the second operating boundary and swiftly reach point A2 in the operating map 500. At this point the flow over the wings is attached, and the air vehicle can continue to accelerate, but concurrently increasing the angle of attack of the wings to reach a point A3 in the third operating region 580 (with the flow over the wings concurrently remaining attached). Thus, even though the air vehicle is operating in the third operating region 580, lift increases rapidly until at point A3 sufficient lift is developed by the wings to enable the air vehicle for example to take off and/or proceed along horizontal aerodynamic flight. In this manner, the air vehicle can take off and/or sustain aerodynamic flight at conditions of the third operating region 580.

Referring to FIG. 2(b) again, operating path S1 can be compared to a conventional operating path, schematically illustrated at S1' in this figure. In the conventional path S1' the corresponding air vehicle is conventionally operated from point A1 by increasing speed (and thus Reynolds number), and possibly increasing angle of attack as well. Accordingly, operation of the air vehicle quickly progresses to the third operating region 580, and the air vehicle is under separated flow conditions of the third operating region 580 for a relative large range R3 of Reynolds numbers, with associated high drag (and thus additional power requirements), as compared with the much smaller and lower range R2 corresponding to operating path S1. Such adverse conditions prevail in conventional operating path S1' until the second operating boundary 555 is crossed, allowing the air vehicle to attain conditions of the second operating region, until at point A4 sufficient lift is developed to enable the air vehicle to take off and/or proceed along horizontal aerodynamic flight. It is apparent that the elapsed time and the energy expenditure in reaching point A4 via operating path S1' are each significantly greater than to reach point A3 via operating path S1. Further, it is also apparent that the velocity (and thus Reynolds number) that is required to be reached for take off and/or to proceed along horizontal aerodynamic flight via operating path S1' is greater than via operating path S1. Where the air vehicle is a VTOL or VSTOL air vehicle vectoring from vertical to horizontal, such differences can be critical in at least some applications.

Figure 25:
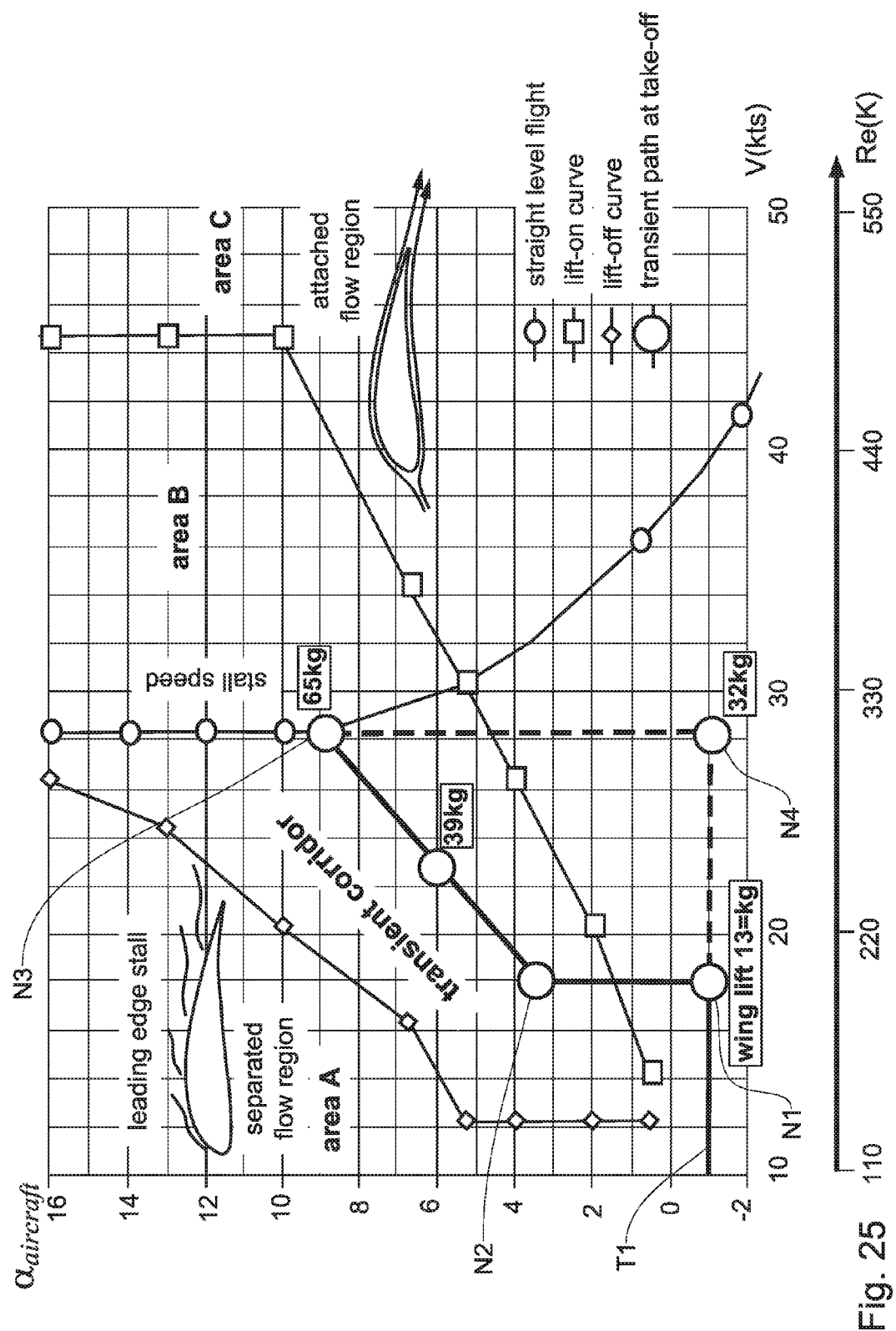
FIG. 25 illustrates an operating map obtained for a VTOL/VSTOL/STOVL UAV having wings corresponding to the example of FIGS. 22(a) and 22(b), weight of 65 Kg, and based on the operating map of FIG. 21, providing an example of a transient corridor for the VTOL/VSTOL/STOVL UAV.
Figure 28:
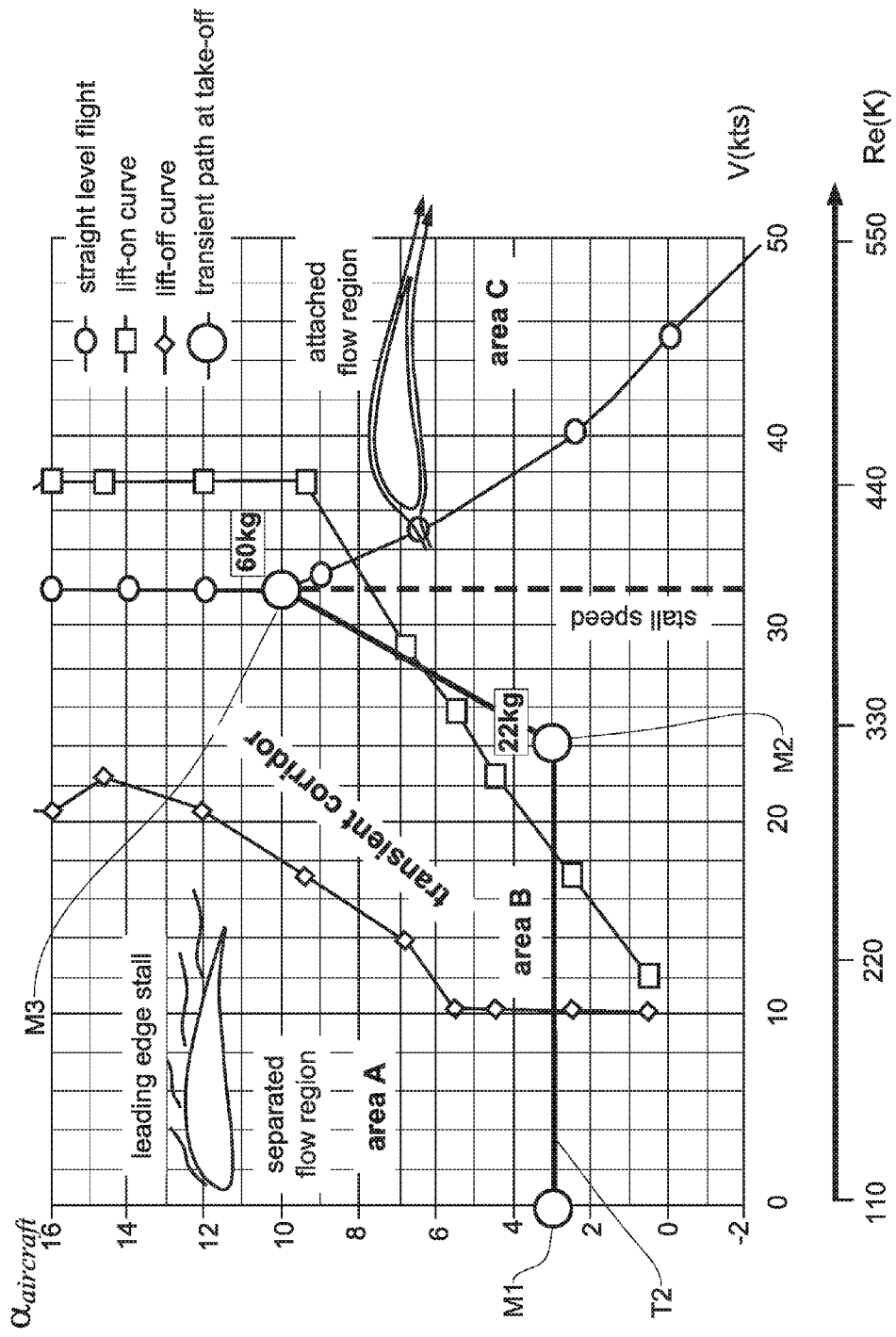
FIG. 28 illustrates an operating map obtained for the example of FIG. 26, weight of 60 Kg, and based on the operating map of FIG. 21 providing an example of a transient corridor for the AK-60 UAV.

However, it is to be noted that acceleration of a small air vehicle to point A4 of path S1', overshooting the required range of operational lift coefficients corresponding to third operating region 580, can in practice bring the air vehicle into a domain of high dynamic pressure and unrealistic lift. Thus, for additional clarity, the operational map 500 can include other parameters, for example the weight of the air vehicle, range of required lift coefficients, actual lift generated at various points in the transient paths, for example as illustrated in FIG. 25 and FIG. 28.

It is also readily evident that, for this example, achieving sustainable flight at point A3 is only possible via path S1 (or another path that reaches the third operating region via the second operating region), but not via the conventional path, and sustained flight at the conditions of A3 are not possible other than by a transient path such as S1, for example.

FIG. 2(b) also illustrates another example of an operating path S2 according to an aspect of the presently disclose subject matter, in which starting with the air vehicle having its wings at an angle of attack α2 (for illustrative purposes, a large angle of attack) at zero or low forward speed (point B1). As the vehicle is accelerated to reach a relatively low Reynolds number, the angle of attack is reduced to cross the second operating boundary, and thus reach point B2 in the operating map 500, in a similar manner to the operating path S1, mutatis mutandis. At point B2 the flow over the wings is attached, and the air vehicle can continue to accelerate, but concurrently increasing the angle of attack of the wings to pass through the third operating region 580 (with the flow over the wings remaining attached), and back again penetrating the second region 550 to reach point B3 at which sufficient lift is developed to enable the air vehicle to take off and/or proceed along horizontal aerodynamic flight. In this manner, the air vehicle can take off and sustain aerodynamic flight at conditions of the second operating region 550.

Operating path S2 can be compared to a conventional operating path, schematically illustrated at S2' in FIG. 2(b). In the conventional path S2' the air vehicle also starts at point B1, but is operated by increasing speed (and thus Reynolds number), and possibly increasing angle of attack as well, in a monotonically increasing manner It is evident from FIG. 2(b) that the air vehicle is thus under separated flow conditions of the third operating region for a relative large range of Reynolds numbers R4, with associated high drag (and thus additional power requirements), as compared with the much smaller and lower range of Reynolds numbers R5 corresponding to operating path S2. In this example, the same operating point B3 is reached via operating path S2 or S2'; however, the drag and energy expenditure in reaching point B3 via operating path S2' are significantly greater via operating path S2' as compared with operating path S2, i.e., path S2 requires significantly less energy expenditure than path S2'.

Thus, the operating map 500 can be used for a variety of maneuvers, including for example conventional take off in situations where take off can occur at relative low Reynolds numbers, for example for small UAVs, and/or including for example flight transition from vectored flight to aerodynamic flight, where the Reynolds numbers can be very low.

Below are provided three non-limiting examples of an operating map generated according to at least some aspects of the presently disclosed subject matter, including a number of examples of using the respective maps to operate the respective air vehicle.

Referring to FIG. 22(a), the three examples are based on a wing 400 having inboard wing section 410 having a transverse cross-section in the form of a single element aerofoil 415, and an outboard wing section 420, having a transverse cross-section in the form of a two-element aerofoils 425.

Furthermore, in these examples, the example of the single element aerofoil 415 is referred to as aerofoil MS-17/DTE, which is a high-lift, mild-stall wing section with divergent trailing edge closure (DTE). The aerofoil MS-17/DTE has a thickness to chord ratio $(t/c)_{max}$ of 17.4%, and a maximum camber $(z_c/c)_{max}$ of 7.2%. The trailing edge has a base thickness to chord ratio (j/c) of 1.2%, and a trailing edge divergence angle $\phi$ of 17.5°.

Aerodynamically, the baseline aerofoil can be designed for example as disclosed in U.S. Pat. Nos. 8,109,473 and 7,992,827, the contents of which are incorporated herein in their entirety, and subsequently the trailing edge can be modified to prove the required divergent edge geometry.

Figure 22C:
FIG. 22(c) illustrates in detail view the divergent trailing edge closure of the example of FIG. 22(b).

FIG. 22(b) shows the general aerofoil geometry, while FIG. 22(c) shows the divergent edge in greater detail. The aerofoil MS-17/DTE was conceived by the present Assignee to produce a plateau of lift coefficients in the wide range of post-stall angles of attack, as disclosed in Israel Patent Application No. 226119. The aerofoil is considered by the Assignee to be particularly suitable for wing design of small Tactical 25 UAV's in view of features provided by the aerofoil allowing operation at low Reynolds numbers and capabilities to ensure flight safety of air vehicle at reduced air speeds. The Assignee considers that the high-lift, mild-stall, characteristics of the aerofoil MS-17/DTE can be of particular use for the wing design of VTOL or VSTOL UAV, facilitating high-lift loitering flight of this air vehicle. However, it is to be noted that the presently disclosed subject matter is not limited to aerofoils with divergent trailing edge, or to UAV's, or to VTOL, VSTOL or STOVL air vehicles, or to mild stall wings, or to high-lift, mild-stall wings, but rather can be applied to any air vehicle where it is required or desired to attain aerodynamic flight at very low Reynolds numbers.

FIG. 5 shows wind tunnel test results of lift coefficient with angle of attack obtained with aerofoil MS-17/DTE, illustrating the high-lift capabilities of the aerofoil at Reynolds numbers of $0.3*10^6$, as well as mild-stall characteristics at an extended range of post-stall angles of attack (also referred to herein as a plateau of lift coefficients). Corresponding pressure distributions of the aerofoil at a number of stall/post-stall angles of attack are shown in FIGS. 6(a) to 6(d). Without being subject to theory, the Assignee considers that these figures illustrate the mechanism of slowly creeping trailing edge separation on the upper surface of the aerofoil combined with rounded pressure distribution at the forward portion of the aerofoil for prevention of formation of leading edge suction peak up to high angles of attack.

Further wind tunnel testing was carried out for the aerofoil MS-17/DTE to determine hysteresis characteristics. Referring to FIG. 7(a), these hysteresis tests indicated that up to an angle of attack $\alpha \sim 29°$ airfoil MS-17/DTE does not exhibit hysteresis phenomena, at Reynolds numbers of $0.3*10^6$, which ensures, at these Reynolds numbers, flight safety of air vehicle when flying at a relative large range of high post-stall angles of attack. At an angle of attack $\alpha=32°$, there is development of a strong hysteresis loop, and without being subject theory, it is considered that there is a burst of the laminar separation bubble which results in fully separated upper surface of the airfoil leading to the development of the strong hysteresis loop, as illustrated in variations of lift coefficient with angle of attack in FIG. 7(b), and the corresponding pressure distributions of FIGS. 8(a) to 8(d). According to aspects of the presently disclosed subject matter, once laminar stall occurs at the leading edge of the airfoil, recovery of the lift requires a drastic decrease of angle of attack.

Figure 9:
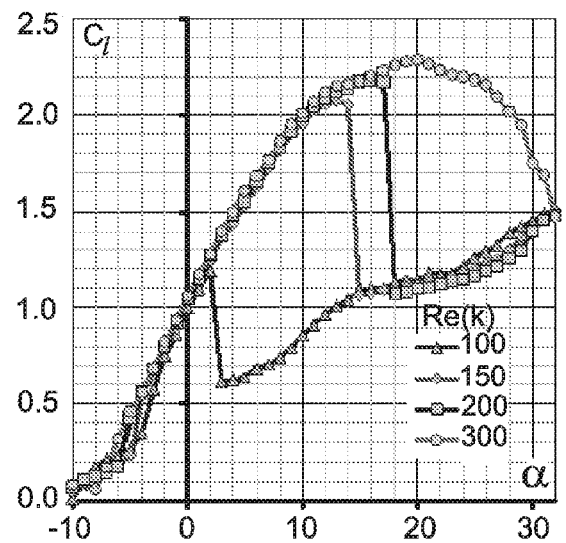
FIG. 9 illustrates lift coefficient distributions obtained in wind tunnel tests of clean aerofoil for a range of low Reynolds numbers for aerofoil MS-17/DTE.
Figure 10A:
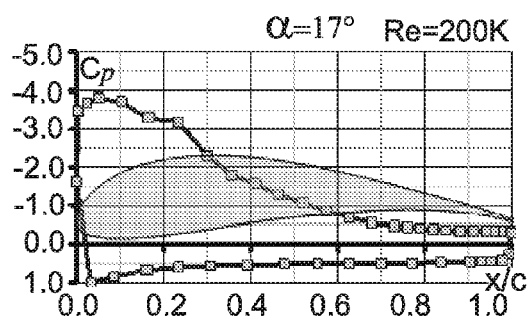
FIGS. 10(a) to 10(d) illustrate pressure distributions obtained in wind tunnel tests at Reynolds numbers of $0.1*10^6$ and $0.2*10^6$ for aerofoil MS-17/DTE.
Figure 10B:
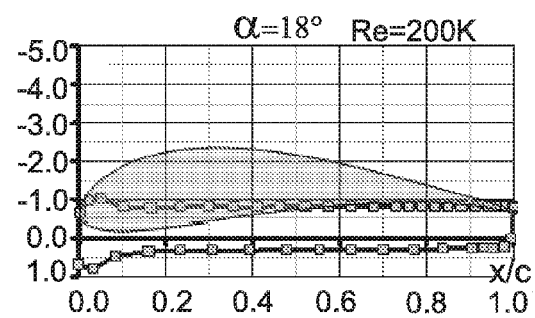
Figure 10C:
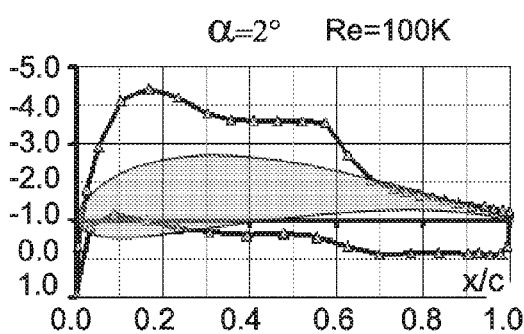
Figure 10D:
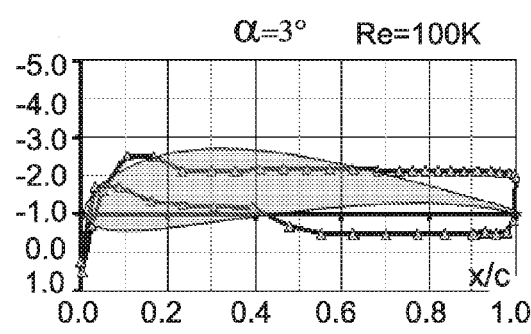

Furthermore, and without being subject theory, at smaller and smaller Reynolds numbers, the burst of laminar separation bubble at the leading edge of clean airfoil occurs at a progressively smaller angle of attack, resulting in unfavorable lift characteristics. FIG. 9 illustrates variations of lift coefficient with angle of attack at different Reynolds numbers, showing the collapse of lift coefficient occurs at smaller angles of attacks as the Reynolds numbers are decreased; FIGS. 10(a) to 10(d) show corresponding pressure distributions over the aerofoil at various angles of attack for Reynolds numbers of $0.1*10^6$ and $0.2*10^6$, illustrating conditions at which there is fully separated flow over the upper surface of the airfoil.

Figure 11:
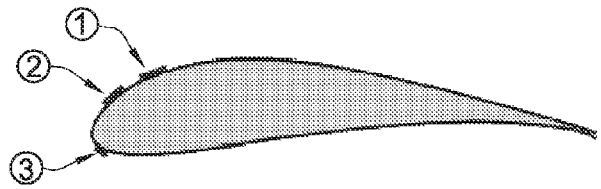
FIG. 11 illustrates roughness strip locations with respect to aerofoil MS-17DTE.

Optionally, transition control methodology can be employed for lift recovery at low Reynolds numbers by delaying the burst of laminar separation bubble to higher angles of attack. Such transition control methodology can include, for example, providing surface roughness at or near the leading edge of the aerofoil, for example as illustrated in FIG. 11.

For example, the suction surface and/or the pressure surface of the aerofoil comprises surface roughness. For example, surface roughness can be provided on the suction surface, on portion thereof for example from about 0% to about 25% of the chord from the leading edge, or for example from about 5% to about 20% of the chord from the leading edge, or for example from about 10% to about 15% of the chord from the leading edge; for example such surface roughness on one or more such portions or on other portions of the surface of the aerofoil can correspond to carborundum grit of different sizes, for example grit #120, or to grit #80, or to grit #60. Additionally or alternatively, surface roughness can be provided on the suction surface for example on portions thereof from about 0% to about 10% of the chord from the leading edge, or for example from about 2% to about 7% of the chord from the leading edge, or for example from about 4% to about 6% of the chord from the leading edge; for example such surface roughness on one or more such portions or on other portions of the surface of the aerofoil can correspond to carborundum grit of different sizes, for example grit #120, or to grit #80, or to grit #60. Additionally or alternatively, surface roughness can be provided on the pressure surface for example on portions thereof from about 0% to about 10% of the chord from the leading edge, or for example from about 1% to about 6% of the chord from the leading edge, or for example from about 2% to about 3% of the chord from the leading edge; for example such surface roughness on one or more such portions or on other portions of the surface of the aerofoil can correspond to carborundum grit of different sizes, for example grit #120, or to grit #80, or to grit #60. In at least some cases, such or other surface roughness can be provided by attaching zig-zag tape, or scotch tape, or specially fabricated ice shapes attached to the leading edge of the aerofoil for simulation of cases of strong contamination in the wind tunnel testing.

Figure 12A:
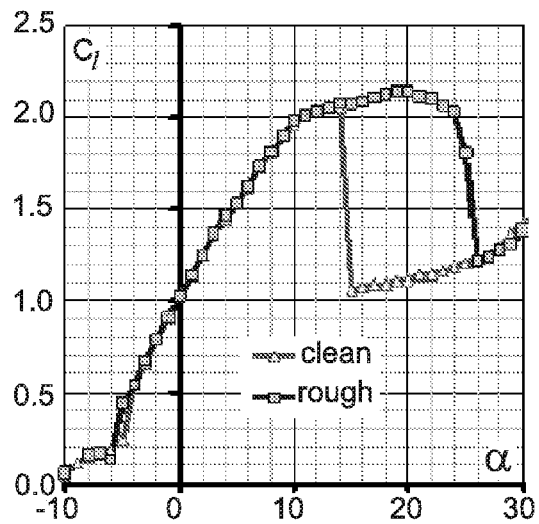
FIG. 12(a) illustrates lift coefficient distributions obtained in wind tunnel tests of clean and rough aerofoil MS-17/DTE at Reynolds numbers of $0.15*10^6$.
Figures 12B, 12C:
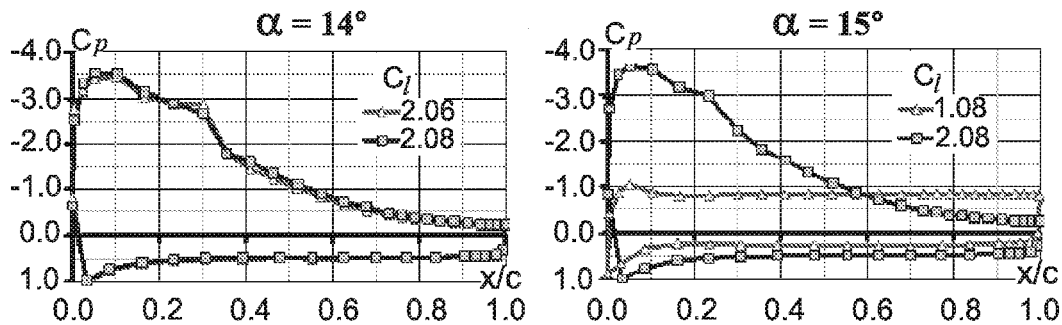
FIG. 12(b) illustrate pressure distributions at angle of attack 14° corresponding to FIG. 12(a)
FIG. 12(c) illustrate pressure distributions at angle of attack 15° corresponding to FIG. 12(a).
Figure 13:
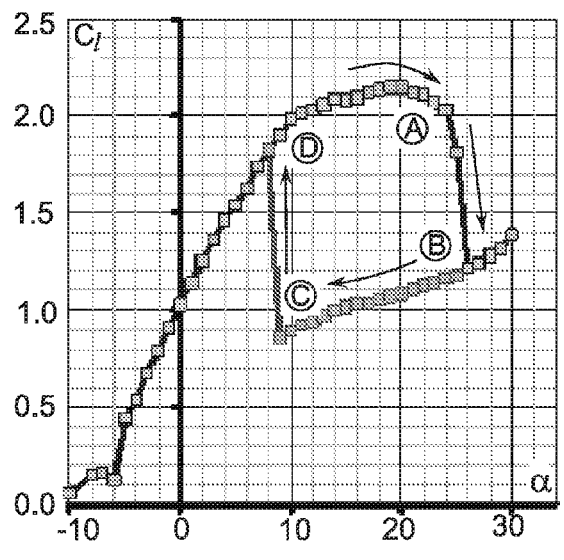
FIG. 13 illustrates a hysteresis loop in the form of lift coefficient distributions obtained in hysteresis tests of rough aerofoil at Reynolds numbers of $0.15*10^6$ for aerofoil MS-17/DTE.
Figure 14A:
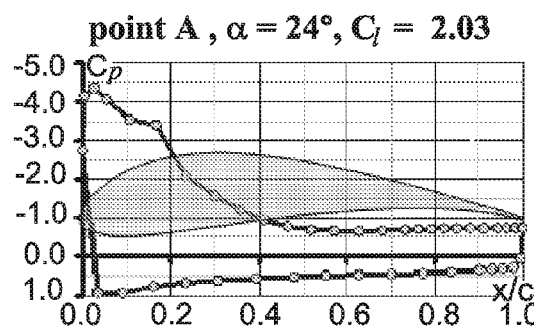
FIGS. 14(a) to 14(d) illustrate pressure distributions obtained in wind tunnel tests at Reynolds numbers of $0.15*10^6$ corresponding to points A to D of the hysteresis loop of FIG. 13.
Figure 14B:
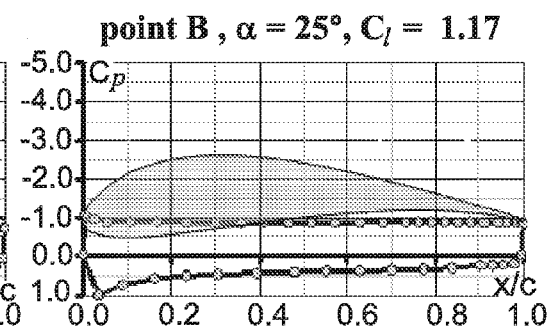
Figure 14C:
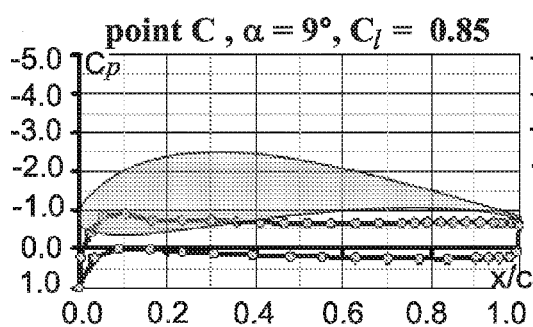
Figure 14D:
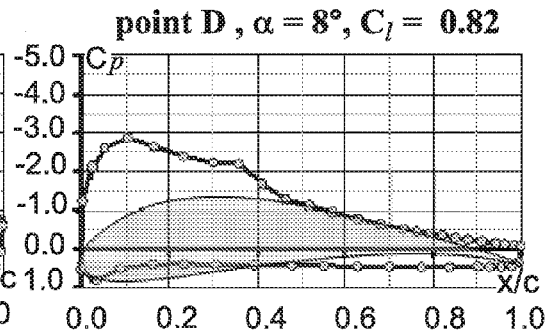

FIG. 12(a) shows variations of lift coefficient with angle of attack obtained with the clean and rough aerofoils at Reynolds numbers of $0.15*10^6$, illustrating the effect of transition control methodology; and FIGS. 12(b) and 12(c) show corresponding pressure distributions at angles of attack 14° and 15°, respectively. It is readily evident that for this particular case, the transition control methodology assisted in recovering the plateau of lift coefficients, i.e., extended the plateau of post-stall lift coefficients from an angle of attack of about 15° to about 24°. As illustrated in FIG. 13, increasing the angle of attack past about 24° initiates hysteresis characteristics, as seen in the development of hysteresis loop defined by points A, B, C, D, which, without being bound by theory results from the burst of laminar bubble. Corresponding pressure distributions at each of the four points A, B, C, D are illustrated in FIGS. 14(a) to 14(d), respectively.

It is readily apparent that at low Reynolds numbers, the development of hysteresis phenomena (considered by the inventors to be associated with burst of laminar separation bubble and laminar stall) results in unacceptable lift characteristics. Radical changes of flight conditions required for lift recovery for these cases are often incompatible with flight safety considerations. Transition control methodology can sometimes be of some help at the domain of low Reynolds numbers, but use of such methodology is accompanied with penalties in maximum lift and drag at higher cruising and loitering Reynolds numbers (for example Reynolds numbers between $0.3*10^6$ and $0.4*10^6$ in the case of VTOL or VSTOL UAV).

At Reynolds numbers below $0.1*10^6$, aerofoil MS-17/DTE is fully separated at all angles of attack. Again, without being bound to theory, applicants consider that at these Reynolds numbers, there is laminar leading edge stall with fully separated upper surface of the aerofoil, reduced level of lift and high rate of energy dissipation (high level of drag). According to at least some aspects of the presently disclosed subject matter, for VTOL or VSTOL UAV at the transient stage between vectored flight and aerodynamic flight, acceleration to relatively high Reynolds numbers is required in order to preempt or minimize the effects of the hysteresis phenomena and to recover lift and drag characteristics of the wing.

In order to establish the first variation X1 of maximum Reynolds number limit with angle of attack $\alpha$, and the second variation X2 of minimum Reynolds number limit with angle of attack $\alpha$, for aerofoil MS-17/DTE, a series of wind tunnel tests were conducted on a two-dimensional wing section having a uniform cross-section corresponding to aerofoil MS-17/DTE. The wing section was placed in the test section of a wind tunnel such that the leading edge of the wing was at zero sweep angle to the airflow, and tested through a range of increasing Reynolds number, and through a range of decreasing Reynolds numbers for each discreet angle of attack within a range of angles of attack, to identify hysteresis behavior and thus establish hysteresis characteristics for each angle of attack.

Figure 15A:
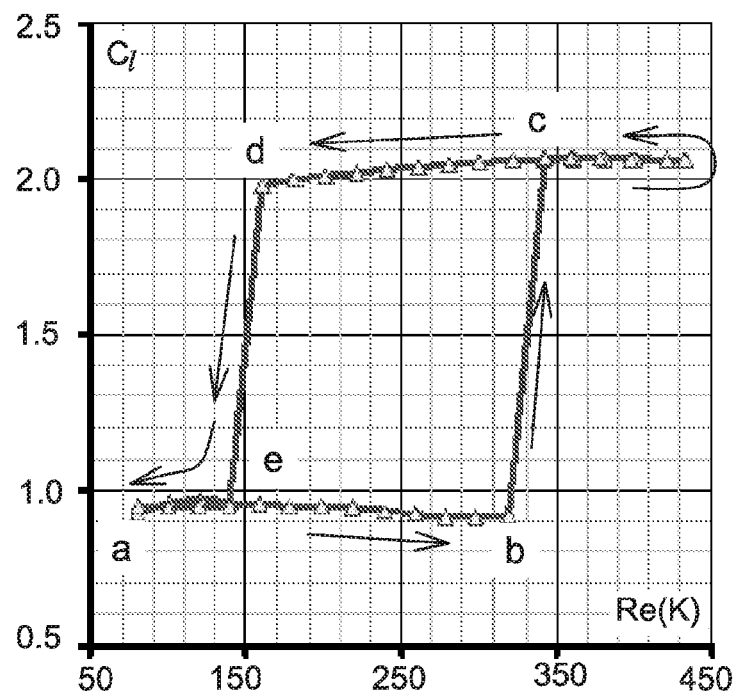
FIG. 15(a) illustrates a hysteresis loop in the form of lift characteristics, in particular variation of lift coefficient with Reynolds numbers illustrating lift-on, lift-off Reynolds numbers for aerofoil MS-17/DTE, at angle of attack constant 12°.
Figure 15B:
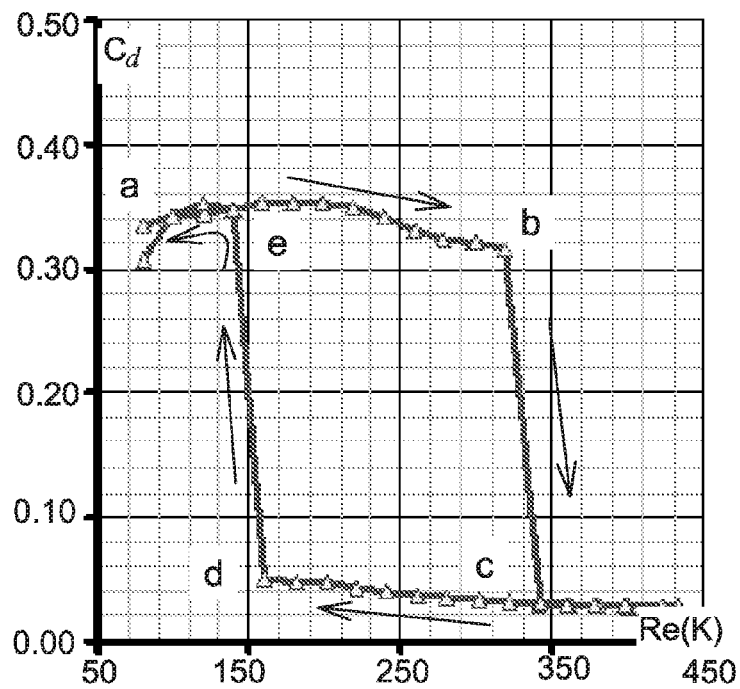
FIG. 15(b) illustrates another hysteresis loop in the form of drag characteristics, in particular variation of drag coefficient with Reynolds numbers corresponding to FIG. 15(a).

At each angle of attack $\alpha$, the corresponding wind tunnel test started at low Reynolds number $0.08*10^6$, ensuring a fully separated upper surface of the aerofoil at the start of evaluation of the hysteresis characteristics at this angle of attack. Typical test results (in terms of lift coefficient and drag coefficient characteristics, each as a function of Reynolds number) at angle of attack $\alpha$ of 12° are shown in FIGS. 15(a) and 15(b), clearly showing the starting point a, and the hysteresis loop defined by points b, c, d, e. Corresponding pressure distributions at each of the five points a, b, c, d, e are illustrated in FIGS. 16(a) to 16(e).

Figure 17A:
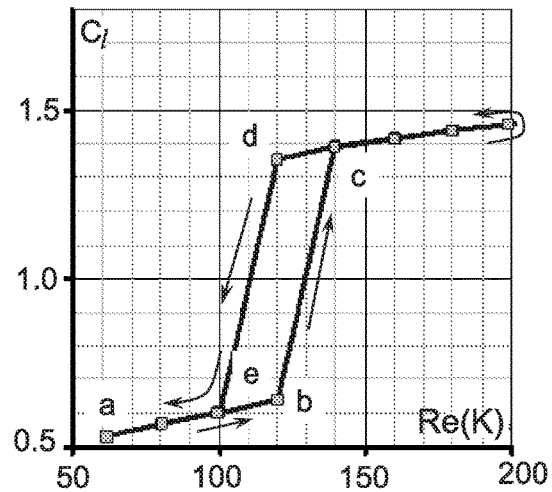
FIG. 17(a) illustrates a hysteresis loop in the form of lift characteristics, in particular variation of lift coefficient with Reynolds numbers illustrating lift-on, lift-off Reynolds numbers for aerofoil MS-17/DTE, at angle of attack constant 4°.
Figure 17B:
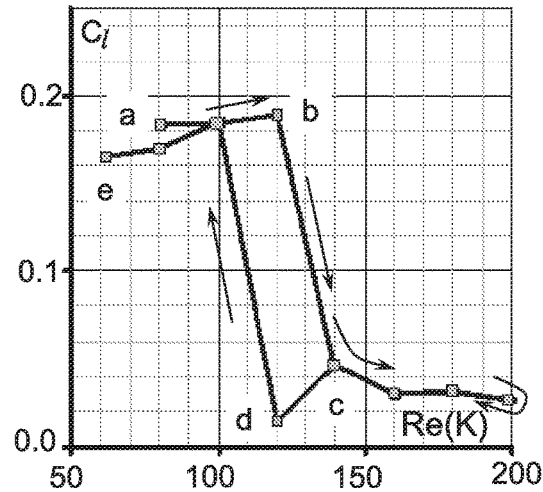
FIG. 17(b) illustrates another hysteresis loop in the form of drag characteristics, in particular variation of drag coefficient with Reynolds numbers corresponding to FIG. 17(a).
Figure 18A:
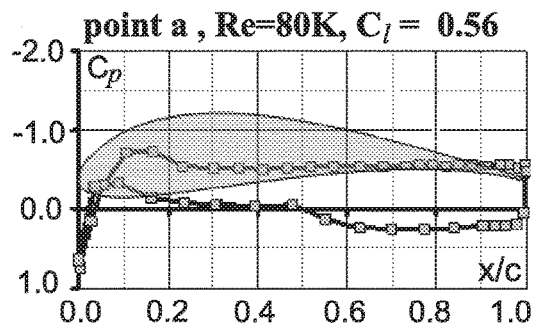
FIGS. 18(a) to 18(e) illustrate pressure distributions corresponding to points a to e of FIGS. 17(a) and 17(b) at angle of attack constant 4°.
Figure 18B:
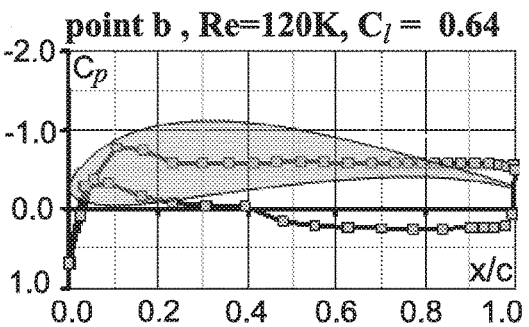
Figure 18C:
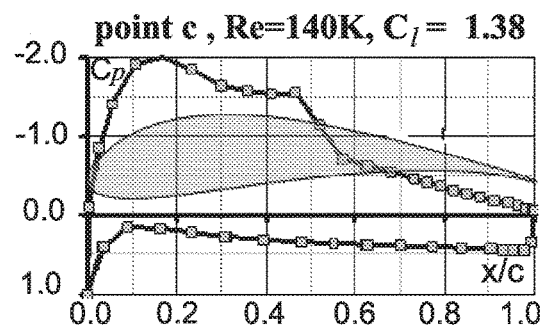
Figure 18D:
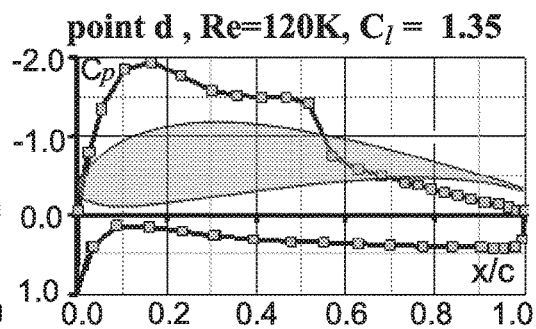
Figure 18E:
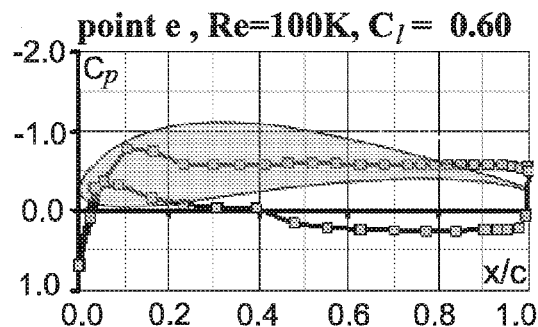

Corresponding test results at angle of attack $\alpha$ of 4° are shown in FIGS. 17(a) and 17(b), clearly showing the respective starting point a and the respective hysteresis loop defined by points b, c, d, e, with corresponding pressure distributions at each of the five points a, b, c, d, e being illustrated in FIGS. 18(a) to 18(e).

As can be appreciated from a comparison of FIGS. 15(a) and 17(a), the lift-on Reynolds numbers (each respective point c) and lift-off Reynolds numbers (each respective point d) each increase with increasing angle of attack.

Figure 19:
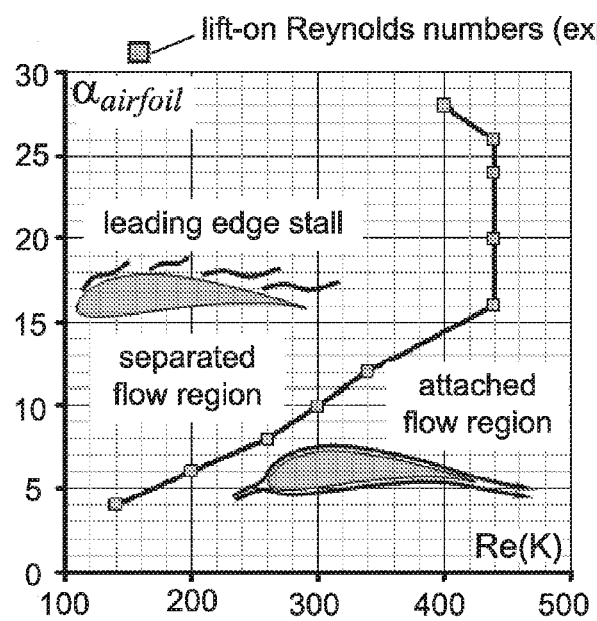
FIG. 19 illustrates a variation of angle of attack with Reynolds numbers illustrating lift-on Reynolds numbers of aerofoil MS-17/DTE, obtained with wind tunnel testing with increasing Reynolds numbers at constant angle of attack.
Figure 20:
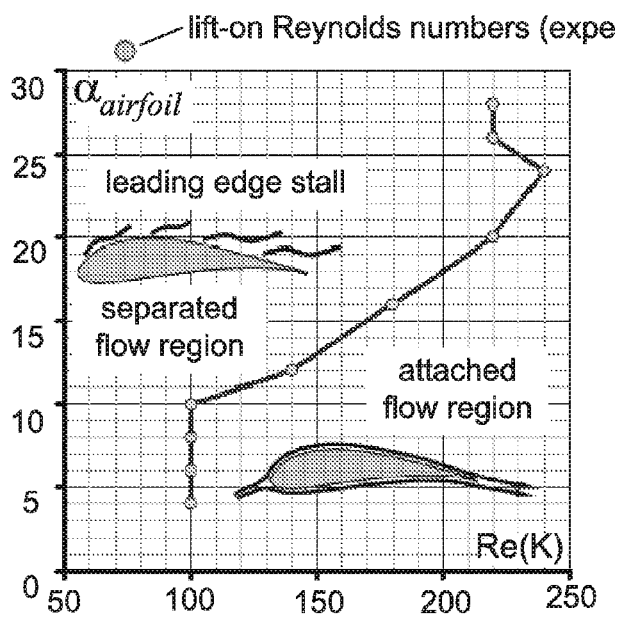
FIG. 20 illustrates a variation of angle of attack with Reynolds numbers illustrating lift-off Reynolds numbers of aerofoil MS-17/DTE, obtained with wind tunnel testing with decreasing Reynolds numbers at constant angle of attack.

FIG. 19 summarizes the test results of the corresponding lift-on Reynolds numbers (each respective point c) with Reynolds numbers for the tested range of angles of attack from 4° to 28°; FIG. 20 summarizes the test results of the corresponding lift-off Reynolds numbers (each respective point d) with Reynolds numbers for the same range of angles of attack from 4° to 28°.

Figure 21:
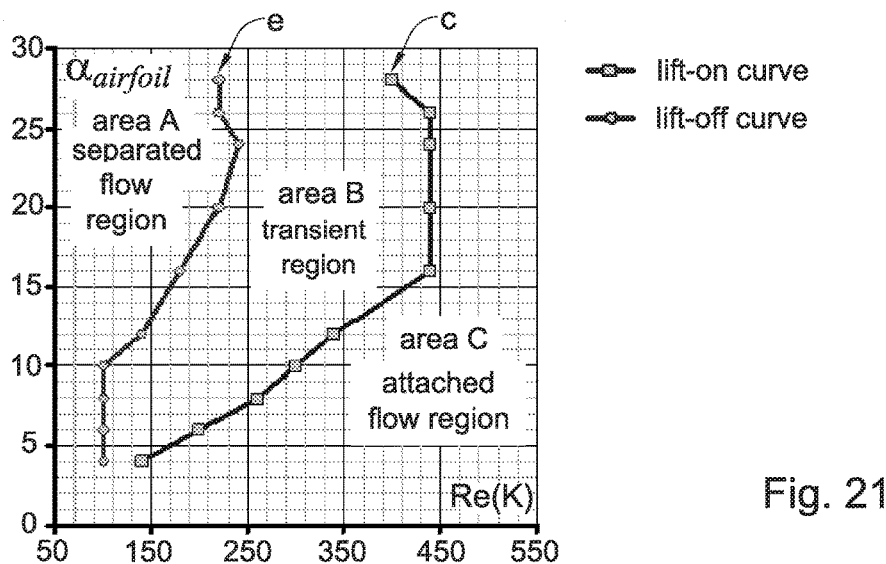
FIG. 21 illustrates an operating map comprising a variation of angle of attack with Reynolds numbers illustrating lift-on and lift-off Reynolds numbers of aerofoil MS-17/DTE, with angle of attack constant, obtained by combination of FIGS. 19 and 20.

The experimental data of FIGS. 19 and 20, are combined in FIG. 21, providing an operating map for this aerofoil, and showing the three operating regions A, B, C, corresponding to the first operating region 510, the third operating region 580 and the second operating region 550, respectively, and the "lift-off curve" and the "lift-on curve", corresponding to the first variation X1 and the second variation X2, respectively, of operating map 500.

Thus, as discussed previously with reference to operating map 500, mutatis mutandis:

Area A (also referred to interchangeably herein as region A) is a region corresponding to fully separated flow, in which there is a low level of lift and high level of drag. Area A corresponds to the first operating region 510 of operating map 500.

Area C (also referred to interchangeably herein as region C) is a region of fully attached flow on both surfaces of the aerofoil. Lift and drag characteristics of the aerofoil are normal at all combinations of angles of attack and Reynolds numbers in area A. Area C corresponds to the second operating region 550 of operating map 500.

Area B (also referred to interchangeably herein as region B) corresponds to the aforesaid transient corridor. Thus, depending on the starting point of the transient flight at combinations of angle of attack and Reynolds number in area B, the flow over the wings can be fully separated or fully attached in this region. Graphically speaking, if area B is penetrated from area A, the aerofoil retains the pattern of fully separated flow over the upper surface until the "lift-on curve" is reached, and sudden recovery of lift and drag characteristics occurs; in other words, area A characteristics are maintained in area B. Conversely, if area B is penetrated from area C, the aerofoil retains the pattern of fully attached flow until the "lift-off curve" is reached, and sudden collapse of lift occurs; in other words, area C characteristics are maintained in area B. Area B corresponds to the third operating region 580 of operating map 500.

The operating map of FIG. 21 for aerofoil MS-17/DTE was then used for operating the following three examples of air vehicles, according to aspects of the presently disclosed subject matter:

(a) first air vehicle~VTOL/VSTOL/STOVL UAV with fixed wing;
(b) second air vehicle~UAV AK-60 (configuration V1);
(c) third air vehicle~UAV AK-60 (configuration V2).

Figure 23:
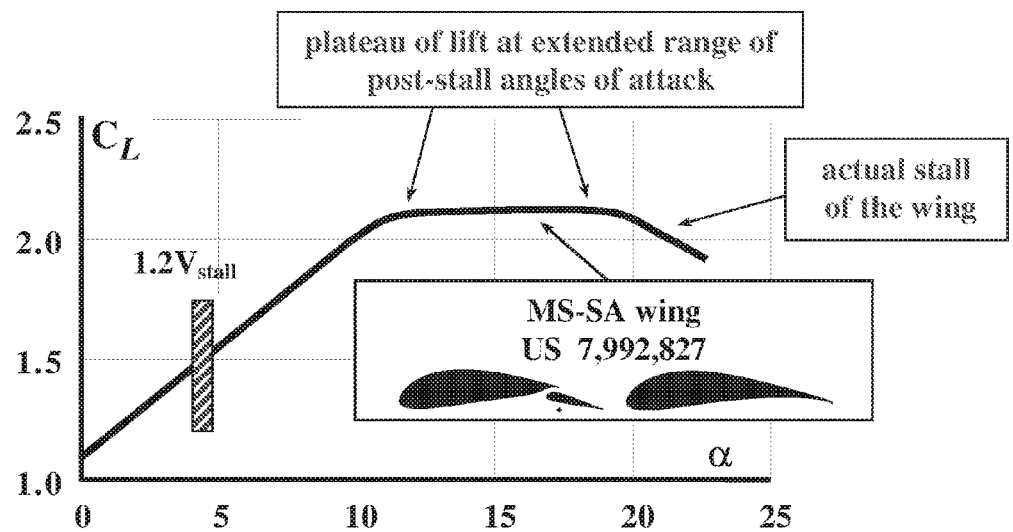
FIG. 23 schematically illustrates a contemplated plateau of lift coefficients for an extended range of post-stall angles of attack for an air vehicle configuration including wings based on the aerofoil of FIG. 22(b).
Figure 24:
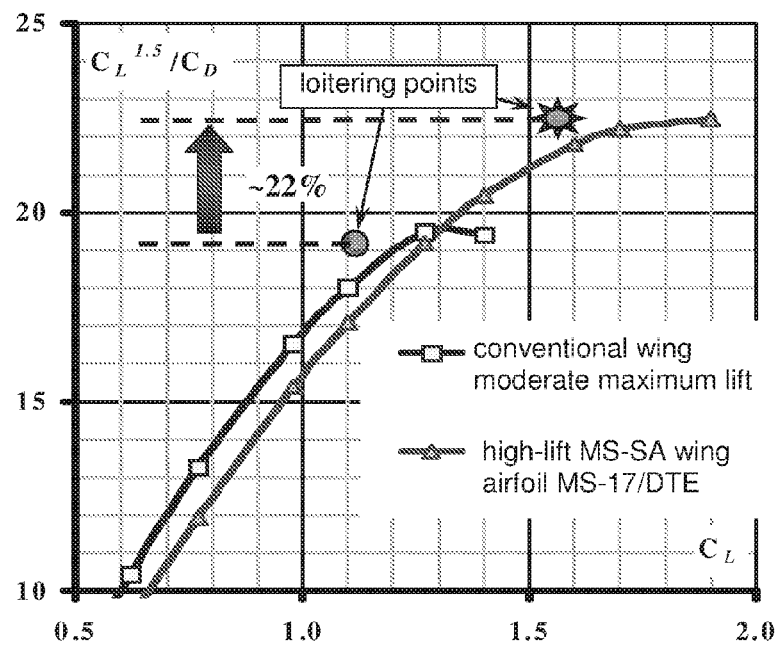
FIG. 24 compares endurance characteristics of conventional wing having moderate maximum lift with endurance characteristics of the wing example of FIGS. 22(a) and 22(b).

Thus the first air vehicle, was a VTOL/VSTOL UAV, weight of about 65 Kg, and the fixed wings thereof were developed based on the concept of mild stall slotted aerofoil (MS-SA) wing (for example as disclosed in U.S. Pat. No. 7,992,827 assigned to the present Assignee, and the contents of which are incorporated herein in their entirety), providing high-lift, mild-stall wings, each wing including an inboard wing portion and an outboard wing portion, corresponding to the wing illustrated in FIG. 22(a). The inboard wing section had cross-sections corresponding to the single-element aerofoil MS-17/DTE, intended to generate a plateau of lift coefficients for an extended range of post-stall angles of attack, illustrated in FIG. 23. The outboard wing section had cross-sections corresponding to a two-element, slotted aerofoil. This arrangement produced a two-level sectional maximum lift coefficient ($C_{lmax}$) limit across the span of the wing, and ensured enhanced aileron efficiency up to high post-stall angles of attack (for example as disclosed in the aforementioned U.S. Pat. No. 7,992,827). In addition to the favorable stall characteristics (which are often a sought feature for small tactical UAV that are required to operate at low airspeeds), the MS-SA based wings of the VTOL/VSTOL/STOVL UAV further enhanced the capability of high-lift, loitering flight, improving significantly the endurance characteristics of the VTOL/VSTOL/STOVL UAV, as can be seen from FIG. 24.

Experimentally evaluated values of lift-on Reynolds numbers and lift-off Reynolds numbers of aerofoil MS-17/DTE, obtained in FIG. 21, were used to determine the corresponding operating map, including definition of the "transient corridor", of the VTOL/VSTOL/STOVL UAV, and this corresponding operating map is illustrated in FIG. 25. In the corresponding operating map of FIG. 25, the vertical axis corresponds to the aircraft angle of attack $\alpha_{aircraft}$ (rather than the aerofoil angle of attack, $\alpha_{aerofoil}$), and takes into account the wing incidence with respect to the fuselage, as well as wing spanload.

The transformation of operating map of FIG. 21 to the operating map of FIG. 25 takes into account the taper and twist of the wings on the air vehicle, and a representative wing chord is often used for analysis, for example the mean wing chord, so that the Reynolds number for the air vehicle is commonly referred to such a mean chord (even though there is a distribution of local sectional Reynolds number along the span of a tapered wing). The aircraft angle of attack $\alpha_{aircraft}$ can differ from the aerofoil angle of attack, $\alpha_{aerofoil}$, due to the following, which can then be applied to transform the aerofoil angle of attack, $\alpha_{aerofoil}$ to the aircraft angle of attack $\alpha_{aircraft}$ (rather than the aerofoil angle of attack, $\alpha_{aerofoil}$:
  the lift coefficient curve with angle of attack for a finite three dimensional wing can differ from that of the two-dimensional aerofoil;
  wing taper and wing twist produce a constant shift of the lift coefficient curve of the finite three dimensional wing;
  aircraft angle of attack is often defined relative to the fuselage setting on the runway, or relative to some reference plane specified in definition of the air vehicle. Wing incidence with respect to the fuselage can produce significant differences between the air vehicle angle of attack and the actual local angle of attack of the wing sections relative to the free airstream.

Referring to FIG. 25, one objective of transient flight (from vectored flight to aerodynamic flight) and of conventional take off (via horizontal acceleration) is to generate sufficient aerodynamic lift for supporting straight level flight i.e., such that the aerodynamic lift generated by the wings is equal to the weight of air vehicle. The combination of aircraft angle of attack and airspeeds required to meet this objective are shown in FIG. 25 for weight of W=65 kg (typical for small Tactical UAV), and indicated as the "straight level flight" curve. It is often advantageous to achieve this goal at the minimum possible airspeeds in order to ensure a favorable energy balance.

The solid line indicated at T1 in FIG. 25 shows a possible transient path of the VTOL/VSTOL/STOVL UAV with thrust vector rotation (for example via engine rotation) from vertical thrust to horizontal thrust, starting at relatively low air speed. According to path T1, initial horizontal acceleration is preformed at slightly negative angle of attack (for example −1°) in order to penetrate into area C of the operating map of FIG. 25 as fast as possible to point N1, thereby ensuring attached flow over the wings at the relatively low speed of about 18 knots (corresponding to Reynolds numbers of about 0.19*10⁶). Thereafter, the angle of attack of the air vehicle is increased to about 3.5° to reach point N2, allowing some build-up of wing lift (wing lift in kg is shown along the transient path T1), since the flow is attached over the wings, and thereby allowing the thrust vector to rotate so that the vertical thrust component supplements the aerodynamic lift to balance the weight of the air vehicle. The angle of attack and airspeed are then concurrently increased in area B (that was penetrated from area C) from N2 to N3 until aerodynamically generated lift force is equal to the weight of air vehicle at point N3, allowing straight level flight with engine rotors producing thrust only in horizontal direction.

For this specific case (path T1 in FIG. 25), the air vehicle is accelerated up to stall airspeed, exploiting stall capabilities of the employed MS-SA wing. For this case, maximum usable lift can be equal to the actual maximum lift because the speed safety margin can often be eliminated for this type of mild-stall wing. Of course, once horizontal engine thrust is set and the air vehicle is in aerodynamically sustained flight, the air vehicle can be accelerated to cruising/loitering airspeeds.

Clearly, a number of different transient paths can be developed for bringing the VTOL/VSTOL/STOVL UAV to aerodynamic flight conditions in an energy efficient way, essentially complying with at least some aspects of the presently disclosed subject matter in which for example there is fast penetration to obtain the conditions of region C in region B, in general by adopting a reduced angle of attack, following by transition to region B (thereby extending the attached flow conditions of region C into region B, and enabling exploiting region B) accompanied by thrust vector rotation to a horizontal setting. One such alternative transient path is indicated at T2 in FIG. 25, in which the small negative angle of attack of −1° is maintained to a higher speed or Reynolds number point N4, corresponding to the stall speed. Thereafter, the angle of attack is increased to about 9° while maintaining the speed constant to reach point N3, at which point the weight is supported by aerodynamic lift generated by the wings.

Figure 26:
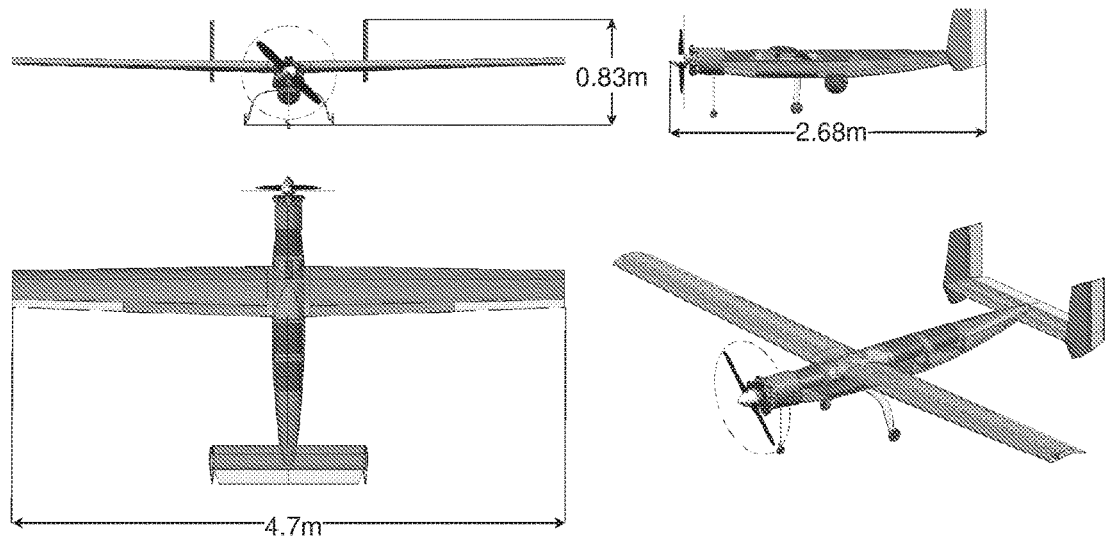
FIG. 26 illustrates in front, side, top and isometric views an AK-60 UAV having wings corresponding to the example of FIGS. 22(a) and 22(b).
Figure 27:
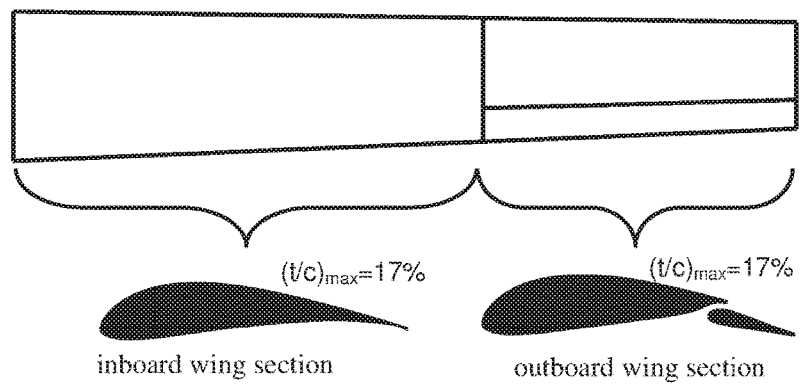
FIG. 27 illustrates in plan view and sample cross-sections a wing half of the example of the air vehicle of FIG. 26.

The second air vehicle example is the UAV AK-60 (configuration V1), which, referring to FIG. 27 also includes the MS-SA wing as disclosed above for the first air vehicle example, mutatis mutandis. General views and dimensions of UAV AK-60 (configuration V1) are shown in FIG. 26, in which for the configuration V1 the angle of attack is about 3° at the take-off position at zero forward speed.

Experimentally evaluated values of lift-on Reynolds numbers and lift-off Reynolds numbers of aerofoil MS-17/DTE obtained in FIG. 21 were used to determine the corresponding operating map, including definition of the "transient corridor", of the UAV AK-60 (configuration V1), and this corresponding operating map is illustrated in FIG. 28. In the corresponding operating map of FIG. 28, the vertical axis corresponds to the aircraft angle of attack (rather than the aerofoil angle of attack), and takes into account the wing incidence with respect to the fuselage, as well as wing spanload.

The solid line indicated at T2 in FIG. 28 shows a possible transient path of the UAV AK-60 (configuration V1) for horizontal take off, for example from a runway, starting at relatively low air speed, for example zero nominal speed. According to path T2, initial horizontal acceleration is preformed at the nominal 3° angle of attack with all three wheels of the undercarriage in contact with the ground. Graphically, this allows for quick penetration into area C of the operating map of FIG. 28 (at the relatively low speed of 18 knots) as fast as possible to point M2, to ensure attached flow over the wings at the relatively low speed of about 24 knots (corresponding to Reynolds numbers of about $0.3*10^6$) at point M2. Thereafter, the angle of attack and airspeed are concurrently increased in area C and then in area B (that was penetrated from area C) from M2 to M3, until aerodynamically generated lift force is equal to the weight of air vehicle at point M3, allowing straight level flight so that the air vehicle can be rotated for take off. Thus, the rotation of UAV AK-60 at take-off is preformed after area B is penetrated from area C, ensuring a fully attached airflow on the wing surface. Once the air vehicle is in aerodynamically sustained flight, the air vehicle can be accelerated to cruising/loitering airspeeds. Clearly, a number of different transient paths can be developed for bringing the UAV AK-60 to aerodynamic flight conditions from horizontal take-off in an energy efficient way, essentially complying with at least some aspects of the presently disclosed subject matter.

The third air vehicle example is the UAV AK-60 (configuration V2), which, referring to FIG. 27 also includes the MS-SA wing as disclosed above for the first air vehicle example and for the second air vehicle example, mutatis mutandis. General views and dimensions of UAV AK-60 (configuration V2) are shown in FIG. 29, in which for the configuration V2 (with the rear wheel arrangement) the angle of attack is about 16° at the take-off position at zero forward speed.

Figure 30:
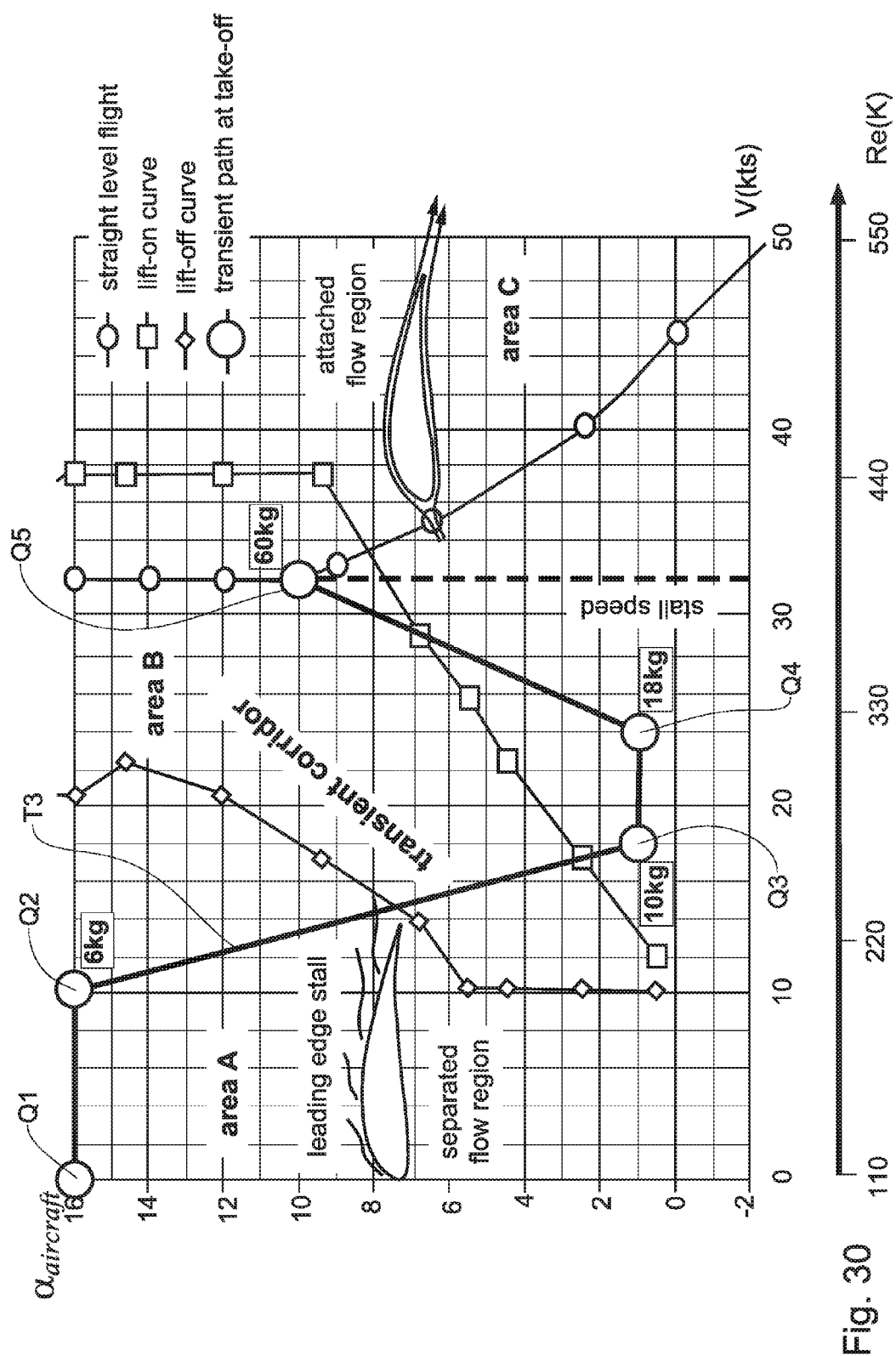
FIG. 30 illustrates an operating map obtained for the example of FIG. 29, weight of 60 Kg, and based on the operating map of FIG. 21 providing an example of a transient corridor for the AK-60 configuration V2 UAV.

As with the second air vehicle, mutatis mutandis, experimentally evaluated values of lift-on Reynolds numbers and lift-off Reynolds numbers of aerofoil MS-17/DTE obtained in FIG. 21 were used to determine the corresponding operating map, including definition of the "transient corridor", of the UAV AK-60 (configuration V2), and this corresponding operating map is illustrated in FIG. 30. In the corresponding operating map of FIG. 30 (which is identical to the corresponding operating map of FIG. 28), the vertical axis corresponds to the aircraft angle of attack (rather than the aerofoil angle of attack), and takes into account the wing incidence with respect to the fuselage, as well as wing spanload.

The solid line indicated at T3 in FIG. 30 shows a possible transient path of the UAV AK-60 for horizontal take off, for example from a runway, starting at relatively low air speed, for example zero nominal speed (point Q1). According to path T3, initial horizontal acceleration is preformed at the nominal 16° angle of attack with all three wheels of the undercarriage in contact with the ground, to point Q2 at a modest forward speed of 8 knots. This is followed by a sharp decrease in angle of attack to about 1° (by nose-down pitching of the air vehicle) while concurrently increasing the airspeed, and graphically, this allows for quick penetration into area C of the operating map of FIG. 30 as fast as possible to point Q3, to ensure attached flow over the wings at this relatively low speed of 18 knots; thereafter the forward speed is increased to about 24 knots (corresponding to Reynolds numbers of about $0.3*10^6$), while maintaining the angle of attack at about 1°. Thereafter, the angle of attack and airspeed are concurrently increased in area C and then in area B (that was penetrated from area C) from Q4 to Q5 until aerodynamically generated lift force is equal to the weight of air vehicle at point Q5, allowing straight level flight so that the air vehicle can be rotated for take off. Thus, the rotation of UAV AK-60 at take-off is performed after area B is penetrated from area C, ensuring a fully attached airflow on the wing surface. Once the air vehicle is in aerodynamically sustained flight, the air vehicle can be accelerated to cruising/loitering airspeeds. Clearly, a number of different transient paths can be developed for bringing the UAV AK-60 to aerodynamic flight conditions from horizontal take-off in an energy efficient way, essentially complying with at least some aspects of the presently disclosed subject matter It is to be noted that the UAV AK-60 (configuration V2) with MS-SA wing cannot perform rotation and lift-off at the initial setting of angle of attack in the parked configuration on the runway, i.e., keeping the angle of attack of 16°. If this were to be attempted, it is considered that the penetration into area C, corresponding to the second operating region 550, would be at high speed and from conditions of separated flow. On entering area C, the corresponding conditions of high dynamic pressure and suddenly attached flow would result in an excessive lift suddenly being generated, applying a large load factor on the wings very rapidly. This leads to undesirable flight response after lift-off and requires a steep decrease of angle of attack in area C, or return to area B in order to properly fly the air vehicle. Thus, accelerating the air vehicle at angle of attack of 16° is in practice very difficult, or at the very least undesirable, to perform with fully separated wing and significant drag penalties. At high dynamic pressure the engine power may be insufficient for overcoming this drag. Further, fully separated flow over the wing during acceleration may produce severe stability and control problems with sometimes unpredictable characteristics. Sudden recovery of lift with excessive load factor leads to severe safety problems.

On the other hand, changing the angle of attack during the take-off run, for example according to path T3, enables to produce acceptable attached flow conditions with respect to transient corridor (area B) and ensure safe take-off in an energy efficient manner, as illustrated in FIG. 30.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the spirit of the presently disclosed subject matter.

The invention claimed is:

1. A method for operating an air vehicle having fixed wings, the method comprising:
   (A) providing an operating map in electronic form in a memory or processor of a computer, the operating map including an angle of attack associated with the fixed wings with Reynolds number, conditions of separated flow over the fixed wings, and conditions of attached flow over the fixed wings; and
   (B) using the operating map for guidance with the computer, causing the air vehicle to operate at least within a low Reynolds numbers range corresponding to the operating map, such as to avoid or minimize risk of causing the air vehicle to operate at conditions of separated flow over the fixed wings.

2. The method according to claim 1, wherein the operating map includes:
   a first operating region in said operating map comprising a plurality of first points therein, each of said plurality of first points representing a respective first set of a respective said angle of attack and a respective said Reynolds number, said first operating region defining a first operating boundary comprising a first variation of a maximum Reynolds number limit with said angle of attack;

a second operating region in said operating map comprising a plurality of second points therein, each of said plurality of second points representing a respective second set of a respective said angle of attack and a respective said Reynolds number, said second operating region defining a second operating boundary comprising a second variation of a minimum Reynolds number limit with said angle of attack;

a third operating region in said operating map extending between said first operating boundary and said second operating boundary, said third operating region comprising a plurality of third points therein, each of said plurality of third points representing a respective third set of a respective said angle of attack and a respective said Reynolds number;

wherein:
- each of said plurality of first points in said first operating region corresponding to conditions of separated flow over the fixed wings irrespective of whether or not the respective said first point was reached from any one of said third points;
- each of said plurality of second points in said second operating region corresponding to conditions of attached flow over the fixed wings irrespective of whether or not the respective said second point was reached from any one of said third points; and
- each of said plurality of third points in said third operating region corresponding to conditions of attached flow or to conditions of separated flow over the fixed wings, depending on whether the respective said third point was reached from any one of said plurality of second points or from any one of said plurality of first points, respectively.

3. The method according to claim 2, wherein step (B) includes (b) causing the air vehicle to operate at a desired said third point by reaching the desired said third point from a first desired said second point.

4. The method according to claim 3, further comprising:
wherein prior to step (b), the air vehicle has nominally zero forward speed; and
(c) causing the air vehicle to arrive at said desired second point from a nominal said first point corresponding to said nominally zero forward speed.

5. The method according to claim 4, wherein at said nominal first point, the air vehicle is on the ground or the air vehicle is supported by an external structure.

6. The method according to claim 4, wherein at least one of the following:
step (c) includes accelerating the air vehicle to attain a forward speed via a forward thrust generated by the air vehicle;
step (c) includes accelerating the air vehicle to attain a forward speed via an external acceleration structure;
step (c) includes accelerating the air vehicle to attain a forward speed via an external acceleration structure, and, wherein said external acceleration structure includes a catapult system;
wherein:
at said nominal first point, the air vehicle is in vectored flight, wherein a vertical vectored thrust generated by the air vehicle support the weight of the air vehicle; or
at said nominal first point, the air vehicle is in vectored flight, wherein a vertical vectored thrust generated by the air vehicle support the weight of the air vehicle, and, wherein step (c) includes accelerating the air vehicle to attain a forward speed via a forward vectored thrust generated by the air vehicle.

7. The method according to claim 4, wherein step (c) includes applying a forward speed to the air vehicle while causing the air vehicle to adopt a respective said angle of attack for the wings having a non-positive value at least at said desired first point.

8. The method according to claim 7, further comprising maintaining the respective said angle of attack for the wings at said non-positive value as said forward speed is increased to a first speed at which the lift generated by the wings is a first proportion of the weight of the air vehicle, and thereafter increasing the respective said angle of attack at said first speed until the air vehicle reaches said desired third point.

9. The method according to claim 4, wherein step (c) includes applying a forward speed to the air vehicle while causing the air vehicle to adopt a respective said angle of attack for the wings having a small positive value at least at said desired first point, and causing the air vehicle to reach said first desired second point by increasing air speed of the air vehicle.

10. The method according to claim 9, further comprising maintaining the respective said angle of attack for the wings at said small positive value as said forward speed is increased to a first speed at which the lift generated by the wings is a first proportion of the weight of the air vehicle, and thereafter increasing the respective said angle of attack and said speed until the air vehicle reaches said desired third point.

11. The method according to claim 1, wherein at said desired third point the respective said Reynolds numbers corresponds to a forward speed of the air vehicle not less than the stall speed of the air vehicle.

12. The method according to claim 1, wherein at said desired third point the respective said Reynolds numbers is less than 450,000, or less than 700,000, or less than 600,000, or between 100,000 and 450,000.

13. The method according to claim 1, wherein at said desired third point the respective said Reynolds numbers is between 300,000 and 450,000, and the respective said angle of attack is between 5° and 10°.

14. The method according to claim 1, further comprising causing the air vehicle to change operating conditions from said desired third point to a second desired second point.

15. The method according to claim 14, further comprising causing the air vehicle to change operating conditions from said desired third point to said second desired said second point by increasing a forward speed of the air vehicle.

16. The method according to claim 14, further comprising causing the air vehicle to reach said second desired second point from said desired third point by changing one or both of the respective said angle of attack and the respective said Reynolds numbers in a manner that excludes crossing said first operating boundary into said first operating region.

17. The method according to claim 3, further comprising at least one of the following:
wherein prior to step (b) the air vehicle has a significant forward speed, the method comprising the step (c) causing the air vehicle to arrive at said desired second point from a nominal said first point corresponding to said significant forward speed;

wherein prior to step (b) the air vehicle has a significant forward speed, the method comprising the step (c) causing the air vehicle to arrive at said desired second point from a nominal said first point corresponding to said significant forward speed, and, wherein said significant forward speed is a cruising speed of the air vehicle;

wherein prior to step (b) the air vehicle has a significant forward speed, the method comprising the step (c) causing the air vehicle to arrive at said desired second point from a nominal said first point corresponding to said significant forward speed, and, wherein said significant forward speed corresponds to conditions of aerodynamic flight;

particularly for operating the air vehicle to arrive at a nominal zero forward speed from a significant forward speed, the step (c) causing the air vehicle to arrive at said desired second point from a nominal said first point corresponding to said significant forward speed;

particularly for operating the air vehicle to arrive at a nominal zero forward speed from a significant forward speed, the step (c) causing the air vehicle to arrive at said desired second point from a nominal said first point corresponding to said significant forward speed, and, wherein said significant forward speed is a cruising speed of the air vehicle;

particularly for operating the air vehicle to arrive at a nominal zero forward speed from a significant forward speed, the step (c) causing the air vehicle to arrive at said desired second point from a nominal said first point corresponding to said significant forward speed, and, wherein said significant forward speed corresponds to conditions of aerodynamic flight.

18. The method according to claim 17, further comprising causing the air vehicle to reach said nominal zero forward speed from said significant forward speed by changing one or both of the respective said angle of attack and the respective said Reynolds numbers in a manner that excludes crossing said first operating boundary into said first operating region.

19. The method according to claim 1, wherein at least one of the following:
said fixed wings include high lift, mild stall aerofoil sections; or
said fixed wings include a divergent trailing edge.

20. An air vehicle having fixed wings and configured for operating as defined in the method of claim 1.

21. The air vehicle according to claim 20, wherein the air vehicle includes any one of:
a UAV;
a UAV and any one of a VTOL, STOVL, or VSTOL air vehicle; or
any one of a VTOL, STOVL, or VSTOL air vehicle.

22. A method for providing an operating map in a memory or processor of a computer of angle of attack versus Reynolds number for an air vehicle having fixed wings, the method comprising:
providing a first operating region in said operating map comprising a plurality of first points therein, each of said plurality of first points representing a respective first set of a respective said angle of attack and a respective said Reynolds number, said first operating region defining a first operating boundary comprising a first variation of a maximum Reynolds number limit with said angle of attack;
providing a second operating region in said operating map comprising a plurality of second points therein, each of said plurality of second points representing a respective second set of a respective said angle of attack and a respective said Reynolds number, said second operating region defining a second operating boundary comprising a second variation of a minimum Reynolds number limit with said angle of attack;
providing a third operating region in said operating map extending between said first operating boundary and said second operating boundary, said third operating region comprising a plurality of third points therein, each of said plurality of third points representing a respective third set of a respective said angle of attack and a respective said Reynolds number, and
providing instructions to a controller of the air vehicle, from the memory or the processor, that causes the air vehicle to operate at least within a low Reynolds number range corresponding to the operating map, such as to avoid or minimize risk of causing the air vehicle to operate at conditions of separated flow over the fixed wings;
wherein each of said plurality of first points in said first region corresponding to conditions of separated flow over the fixed wings irrespective of whether or not the respective said first point was reached from any one of said third points;
wherein each of said plurality of second points in said second region corresponding to conditions of attached flow over the fixed wings irrespective of whether or not the respective said second point was reached from any one of said third points; and
wherein each of said plurality of third points in said third region corresponding to conditions of attached flow or to conditions of separated flow over the fixed wings, depending on whether the respective said third point was reached from any one of said second points or from any one of said first points, respectively.

23. The method according to claim 22, further comprising determining at each of a plurality of angle of attack for the wings, respective hysteresis characteristics of a respective variation of wing lift coefficient with Reynolds number, whereby to identify for each respective said angle of attack the respective said minimum Reynolds number limit and the respective said maximum Reynolds number limit.

24. The method according to claim 23, wherein at each said angle of attack, the respective said minimum Reynolds number limit corresponds to a Reynolds number at which the rate of change of lift coefficient with Reynolds number suddenly drops when decreasing Reynolds number.

25. The method according to claim 23, wherein at each said angle of attack, the respective said maximum Reynolds number limit corresponds to a Reynolds number at which the rate of change of lift coefficient with Reynolds number suddenly drops when increasing Reynolds number.

26. An operating map in a memory or process or a computer of angle of attack versus Reynolds number for an air vehicle having fixed wings, the operating map comprising:
a first operating region in said operating map comprising a plurality of first points therein, each of said plurality of first points representing a respective first set of a respective said angle of attack and a respective said Reynolds number, said first operating region defining a first operating boundary comprising a first variation of a maximum Reynolds number limit with said angle of attack;
a second operating region in said operating map comprising a plurality of second points therein, each of said plurality of second points representing a respective second set of a respective said angle of attack and a respective said Reynolds number, said second operating region defining a second operating boundary comprising a second variation of a minimum Reynolds number limit with said angle of attack;

a third operating region in said operating map extending between said first operating boundary and said second operating boundary, said third operating region comprising a plurality of third points therein, each of said plurality of third points representing a respective third set of a respective said angle of attack and a respective said Reynolds number; and instructions for a controller of the air vehicle, from the memory or the processor, that cause the air vehicle to operate at least within a low Reynolds number range, such as to avoid or minimize risk of causing the air vehicle to operate at conditions of separated flow over the fixed wings;

wherein:
each of said plurality of first points in said first operating region corresponding to conditions of separated flow over the fixed wings irrespective of whether or not the respective said first point was reached from any one of said third points;

each of said plurality of second points in said second operating region corresponding to conditions of attached flow over the fixed wings irrespective of whether or not the respective said second point was reached from any one of said third points; and each of said plurality of third points in said third operating region corresponding to conditions of attached flow or to conditions of separated flow over the fixed wings, depending on whether the respective said third point was reached from any one of said plurality of second points or from any one of said plurality of first points, respectively.

27. A method for operating an air vehicle having fixed wings, the method comprising:
(A) providing an operating map in visual form, the operating map including an angle of attack associated with the fixed wings with Reynolds number, conditions of separated flow over the fixed wings, and conditions of attached flow over the fixed wings; and
(B) using the operating map for guidance, manually causing the air vehicle to operate at least within a low Reynolds numbers range corresponding to the operating map, such as to avoid or minimize risk of causing the air vehicle to operate at conditions of separated flow over the fixed wings.

* * * * *

UNITED STATES PATENT AND TRADEMARK OFFICE
CERTIFICATE OF CORRECTION

PATENT NO. : 10,279,907 B2  
APPLICATION NO. : 15/113368  
DATED : May 7, 2019  
INVENTOR(S) : Michael Shepshelovich et al.

Page 1 of 1

It is certified that error appears in the above-identified patent and that said Letters Patent is hereby corrected as shown below:

On the Title Page

Insert -- Foreign Application Priority Data  
Jan. 28, 2014 (IL) ........................230703 -- therefor Signed and Sealed this  
Nineteenth Day of May, 2020

Andrei Iancu  
*Director of the United States Patent and Trademark Office*